United States Patent
Paré et al.

(10) Patent No.: US 10,764,677 B2
(45) Date of Patent: Sep. 1, 2020

(54) TWO-WAY COMMUNICATION SYSTEM AND METHOD OF USE

(71) Applicant: Sonitus Technologies, Inc., San Mateo, CA (US)

(72) Inventors: Michael Paré, San Carlos, CA (US); Timothy L. Proulx, Santa Cruz, CA (US)

(73) Assignee: Sonitus Technologies, Inc., San Mateo, CA (US)

( * ) Notice: Subject to any disclaimer, the term of this patent is extended or adjusted under 35 U.S.C. 154(b) by 153 days.

(21) Appl. No.: 16/129,536

(22) Filed: Sep. 12, 2018

(65) Prior Publication Data

US 2019/0090053 A1   Mar. 21, 2019

Related U.S. Application Data

(60) Provisional application No. 62/557,402, filed on Sep. 12, 2017.

(51) Int. Cl.
| | | |
|---|---|---|
| H04R 1/46 | (2006.01) | |
| H04R 1/10 | (2006.01) | |
| H04B 5/02 | (2006.01) | |
| H04B 5/06 | (2006.01) | |
| H04R 19/00 | (2006.01) | |
| H04R 25/00 | (2006.01) | |

(52) U.S. Cl.
CPC .............. *H04R 1/46* (2013.01); *H04B 5/02* (2013.01); *H04B 5/06* (2013.01); *H04R 1/1083* (2013.01); *H04R 19/005* (2013.01); *H04R 25/554* (2013.01); *H04R 25/556* (2013.01); *H04R 25/606* (2013.01); *H04R 1/1041* (2013.01); *H04R 2201/003* (2013.01); *H04R 2201/107* (2013.01); *H04R 2460/13* (2013.01)

(58) Field of Classification Search
CPC .......... H04R 1/08; H04R 1/46; H04R 1/1041; H04R 25/554; H04R 25/604; H04R 25/606; H04R 2201/107; H04R 2225/67; H04R 2460/13
USPC ........ 381/315, 322, 324, 326, 328, 380, 151
See application file for complete search history.

(56) References Cited

U.S. PATENT DOCUMENTS

| | | | | |
|---|---|---|---|---|
| 3,985,977 A | * | 10/1976 | Beaty | H04B 5/0075 455/41.1 |
| 5,477,489 A | * | 12/1995 | Wiedmann | G11C 8/16 365/154 |
| 5,680,028 A | | 10/1997 | McEachern | |
| 6,057,668 A | | 5/2000 | Chao | |
| 7,664,277 B2 | * | 2/2010 | Abolfathi | B33Y 80/00 381/151 |
| 7,844,064 B2 | * | 11/2010 | Abolfathi | H04R 1/46 381/326 |

(Continued)

FOREIGN PATENT DOCUMENTS

| | | |
|---|---|---|
| WO | WO 2006/055723 | 5/2006 |
| WO | WO 2019/055544 | 3/2019 |

*Primary Examiner* — Huyen D Le
(74) *Attorney, Agent, or Firm* — Levine Bagade Han LLP

(57) ABSTRACT

The two-way communication system comprises a non-invasive and non-implanted system which allows for clear two-way communications. This system is generally comprised of a mouthpiece component, relay component, infrastructure communication device, an optional earpiece component, and an optional system control which may interface with the relay component.

70 Claims, 12 Drawing Sheets

(56) References Cited

U.S. PATENT DOCUMENTS

| | | |
|---|---|---|
| 2005/0196008 A1 | 9/2005 | Anjanappa et al. |
| 2007/0035917 A1 | 2/2007 | Hotelling et al. |
| 2008/0070181 A1 | 3/2008 | Abolfathi et al. |
| 2008/0205678 A1 | 8/2008 | Boguslayskij et al. |
| 2009/0226020 A1 | 9/2009 | Abolfathi et al. |
| 2011/0207990 A1 | 8/2011 | Mersky |
| 2011/0319021 A1 | 12/2011 | Proulx et al. |
| 2012/0235632 A9 | 9/2012 | Kassayan et al. |
| 2013/0133671 A1 | 5/2013 | Fairclough et al. |
| 2013/0211270 A1 | 8/2013 | St. Laurent et al. |
| 2014/0321674 A1 | 10/2014 | Abolfathi |
| 2017/0070797 A1 | 3/2017 | Spector et al. |
| 2017/0148428 A1 | 5/2017 | Thuy et al. |
| 2018/0191389 A1 | 7/2018 | Pare |

\* cited by examiner

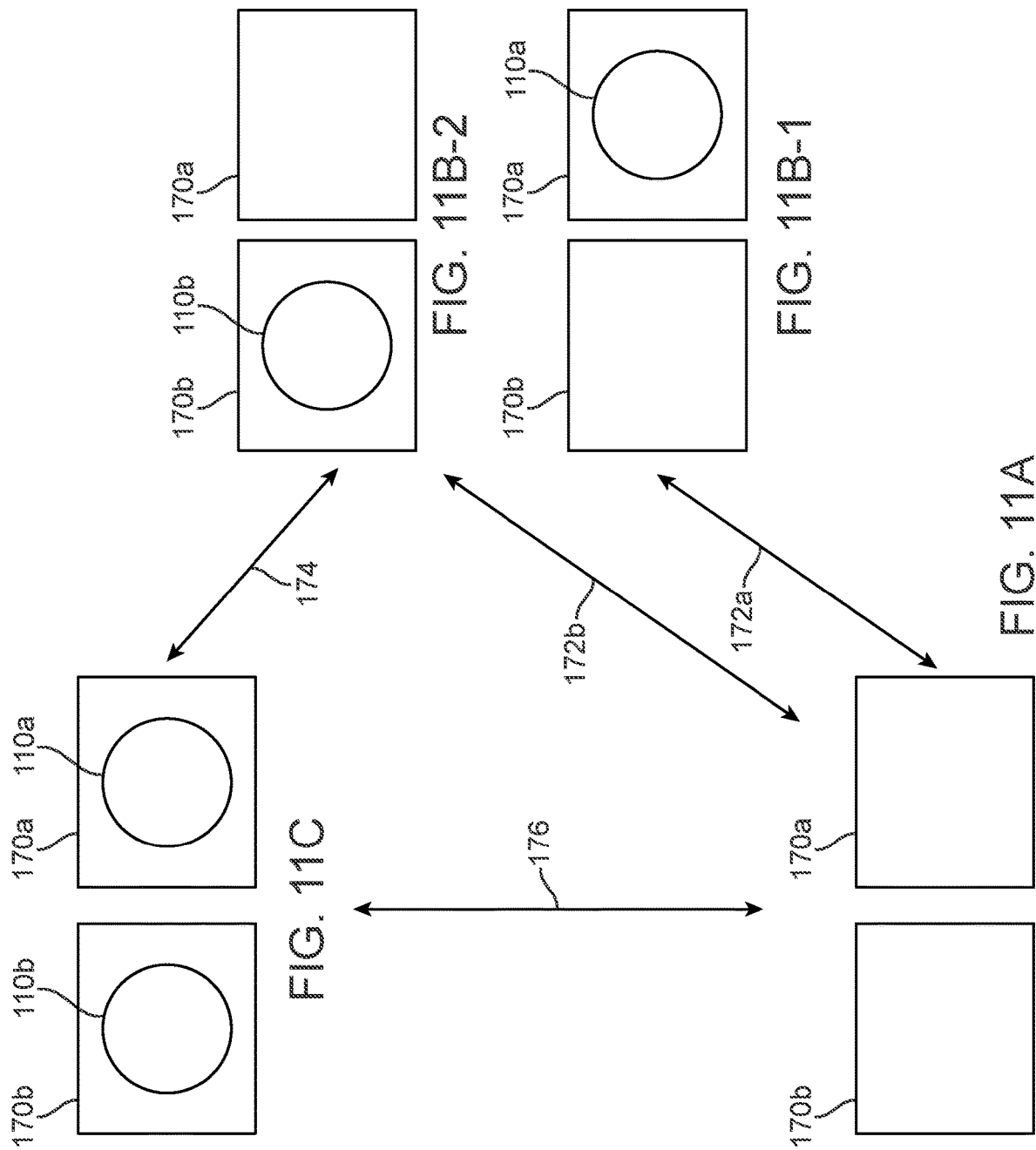

TWO-WAY COMMUNICATION SYSTEM AND METHOD OF USE

CROSS-REFERENCE TO RELATED APPLICATION

This application claims priority to U.S. Provisional Application No. 62/557,402 filed Sep. 12, 2017, which is herein incorporated by reference in its entirety for all purposes.

FIELD OF THE INVENTION

Systems, devices and methods for two-way communication are disclosed. More specifically, systems, devices and methods for two-way communication are disclosed that have a mouthpiece component and an optional earpiece component. The mouthpiece and/or earpiece component can each provide one-way or two-way communication.

BACKGROUND OF THE INVENTION

Covert operations necessitate communication systems with very specific and stringent requirements. Such operations typically require clear two-way communications systems which are not visible or minimally visible to an outside observer, that allow for complete audio awareness of the environment, and which can be utilized in a less than overt manner.

Current technology has not been able to completely meet these requirements as existing systems invariably include some small visible component observable to a perceptive onlooker. Current communication systems also suffer from an inability to effectively communicate the user's speech when in very loud environments due to poor signal to noise ratio.

Accordingly, there is a need for a communication system that fully meets the stringent requirements of covert operations and allows for clear audio transmissions even in high noise situations.

BRIEF SUMMARY OF THE INVENTION

The present disclosure relates generally to two-way communication with a mouthpiece component and/or an earpiece component. More specifically, the present disclosure relates to two-way communication with a mouthpiece component and an optional earpiece component.

The communication system disclosed allows the operator or user to hear their environment by leaving their hearing unobstructed and thereby enables complete audio situational awareness by the operator.

Generally, one variation of a two-way communication system may comprise a mouthpiece component having a housing which is configured for temporary securement upon a tooth or teeth of a user, the housing having an integrated antenna with one or more loop coils arranged (e.g., symmetrically or asymmetrically) within the housing. An infrastructure communication device which is configured to transmit or receive signals from the mouthpiece component and communicate with a remote communication device may also be included, as well as a relay component in communication with the mouthpiece component and which is configured to interface between the mouthpiece component and the infrastructure communication device.

In another variation, the two-way communication system may also comprise a system control which is in communication with the relay component and which is also configured to wirelessly provide an input to the relay component.

BRIEF DESCRIPTION OF THE DRAWINGS

The drawings shown and described are exemplary embodiments and non-limiting. Like reference numerals indicate identical or functionally equivalent features throughout.

FIGS. 11A-11C illustrate a variation of a process of wearing and removing a left and a right earpiece component.

DETAILED DESCRIPTION

Figure 1:
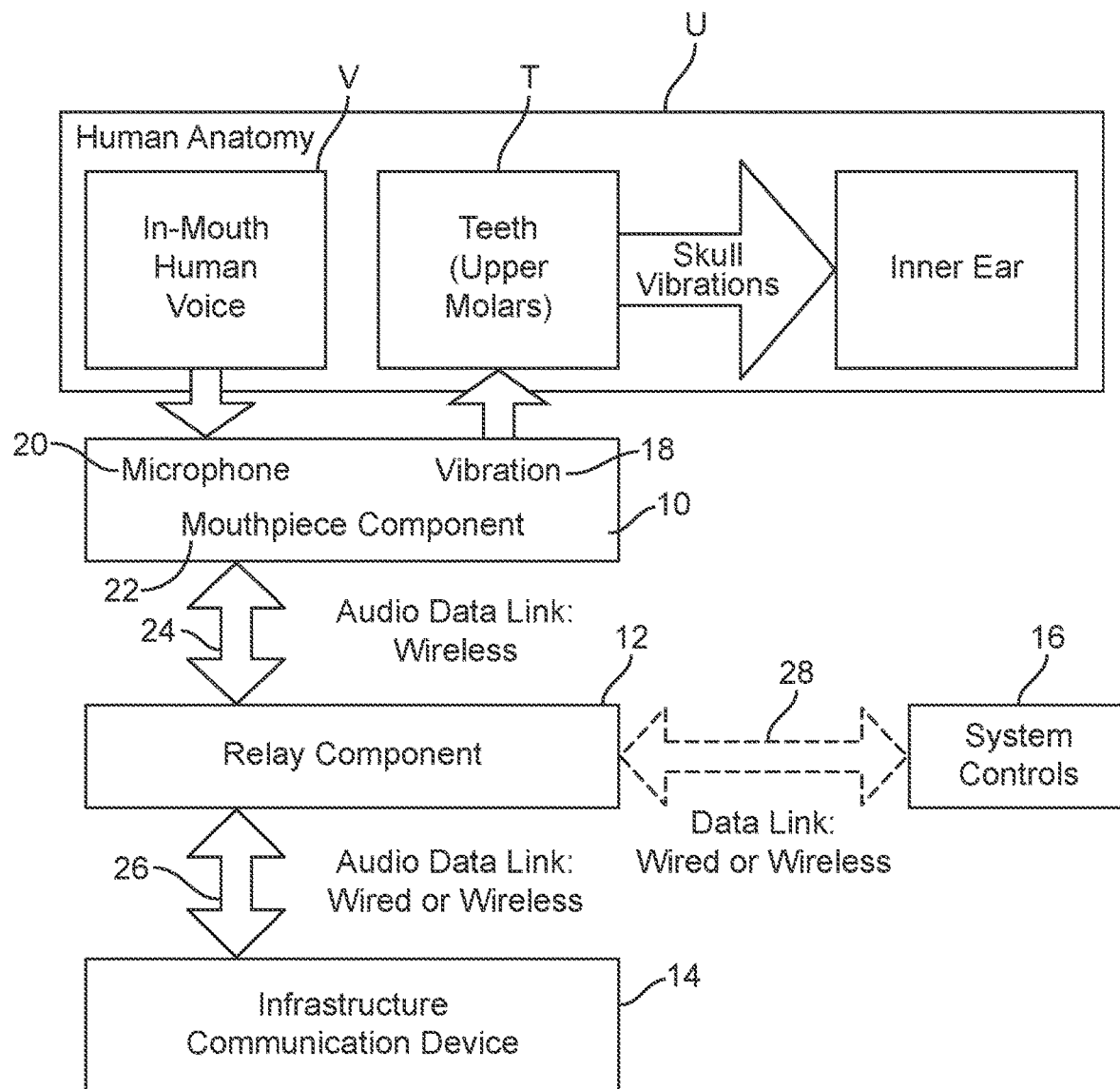
FIG. 1 shows a schematic representation of a variation of a two-way communication system having a mouthpiece component, a relay component, an infrastructure communication device, and/or a system control.

Systems, devices and methods for two-way communication are disclosed that can provide reliable and/or clear incoming and/or outgoing communication. The systems, devices and methods disclosed can provide reliable and/or clear communication in any environment, for example, low noise environments, medium noise environments, high noise environments, or any combination thereof. The systems, devices and methods disclosed can be adjusted in real-time, manually or automatically, to advantageously function in one or multiple environments that have, for example, dynamic noise conditions.

The systems, devices and methods disclosed can be partially or completely visible or invisible to an outside observer when in use by an operator or user. For example, one or multiple components of the systems, devices and methods disclosed—including the entire system—can be partially or completely visible or invisible, for example, to another person, an image capturing system (e.g., a camera- or video-based surveillance system), or any combination thereof.

The communication systems disclosed can be non-invasive systems, invasive systems, non-implanted systems, implanted systems, or any combination thereof. For example, the communication systems disclosed can be non-invasive and non-implanted systems.

The communication systems disclosed can allow for clear two-way half-duplex and/or full-duplex communications.

The systems disclosed can allow the operator or user to hear their environment by leaving their hearing unobstructed and thereby enable complete audio situational awareness by the operator. With the addition of hearing protection, the same systems instantly convert into complete tactical and general purpose communication systems, functional in high noise environments.

One aspect of the systems disclosed is the use of an in-mouth communication device (also referred to as a mouthpiece component) utilizing bone conduction driven into the teeth for received audio, and an integrated microphone as part of the mouthpiece component. For example, the mouthpiece component can have one or multiple mouthpiece microphones. The mouthpiece microphone(s) can be attached to or integrated with the mouthpiece component. Using the in-mouth communication device, the operator may leave the ears completely open and unobstructed to enable the user to be situationally aware. Clear communications are possible while eliminating all cables and headsets.

The communication systems disclosed are particularly well suited for low-visibility applications as all parts of the system may either be hidden under clothes or are otherwise not visible to an external observer. For loud environments where in-ear or on-ear hearing protection is warranted or otherwise desirable, the same communication systems may be used as a general purpose and/or tactical communication system by incorporating hearing protection. This not only provides safety for the user, but also allows for reduced external noise competition for the user's attention, such that incoming audio communications may be heard and understood with more clarity. Furthermore, having the microphone embedded in the mouthpiece component enables extremely good noise shielding capabilities such that clear outgoing audio transmissions are possible even in loud environments (e.g., deafeningly loud environments). In cases where hearing protection is acceptable, the system may also be used as a general purpose communication system.

The system can have (a) a mouthpiece component 10, (b) a relay component 12, (c) an infrastructure communication device 14, (d) system controls 16, (e) an earpiece component 100, or any combination thereof (e.g., the earpiece component 100 can be optional). For example, FIG. 1 illustrates that the system can have (a) a mouthpiece component 10, (b) a relay component 12 and (c) an infrastructure communication device 14. As another example, FIG. 1 illustrates that the system can have (a) a mouthpiece component 10, (b) a relay component 12, (c) an infrastructure communication device 14 and (d) system controls 16. The system controls 16 may interface with the relay component 12, as shown in the schematic diagram of FIG. 1.

Variations of individual system components are detailed below, including different options for embodiments and particular design attributes.

Mouthpiece Component

The mouthpiece component 10 removably attaches or clamps onto or around the molars, e.g., upper back molars, of the operator or user U and allows for normal speech, eating, and drinking without impediment. Additionally, the mouthpiece component 10 may be temporarily secured to the user's tooth or teeth without having to alter the user's dentition in any way such that the user may simply remove the component 10 from the tooth or teeth when finished, leaving the dentition unaltered. When the mouthpiece component 10 is to be used again, it may be simply reinserted within the mouth and secured to the tooth or teeth again. The mouthpiece component 10 also utilizes bone-conduction technology by actuating one or more transducers 18 incorporated into the mouthpiece component 10 and vibrationally coupled to the teeth T to convey incoming audio to the user, as indicated by the vibrational conductance. The mouthpiece component 10 also integrates a microphone assembly 20 to capture the user's speech V for outgoing audio transmissions. The mouthpiece component 10 may also incorporate a transmitter and/or receiver such as a transceiver 22 which enables wireless communication 24 with the relay component 12 to receive and transmit audio data.

The mouthpiece component 10 may be comprised of a low-profile housing configured for temporary securement within the mouth and upon the tooth or teeth of the operator. This mouthpiece component 10 utilized may be described in further detail in any one of the following patent references: U.S. Pat. Nos. 7,664,277; 7,682,303; 7,724,911; 7,796,769; 7,801,319; 7,844,064; 7,844,070; 7,854,698; 7,876,906; 7,945,068; 7,974,845; 8,023,676; 8,150,075; 8,160,279; 8,170,242; 8,177,705; 8,224,013; 8,233,654; 8,254,611; 8,270,637; 8,270,638; 8,291,912; 8,295,506; 8,333,203; 8,358,792; 8,433,080; 8,433,082; 8,433,083; 8,503,930; 8,577,066; 8,585,575; 8,588,447; 8,649,535; 8,649,536; 8,649,543; 8,660,278; 8,712,077; 8,712,078; 8,795,172; 8,867,994; 9,113,262; 9,143,873; 9,185,485; 9,247,332. These patent references are incorporated herein by reference in their entirety and for any purpose herein.

The wireless link 24 between the mouthpiece 10 and relay component 12 is utilized in order to get audio data into and out of the mouth area may utilize any number of wireless data transmission protocols, e.g., near field magnetic induction (NFMI), radio frequency (RF) link such as BLUETOOTH®, body conduction, or acoustic signals at or above human hearing. Utilizing NFMI is generally preferable to RF due to reduced attenuation through body tissue and also due to a reduced electromagnetic far field profile. Regardless of wireless link implementation, the data can be encrypted to ensure security using, e.g., AES-256 or other encryption standards.

Figure 2:
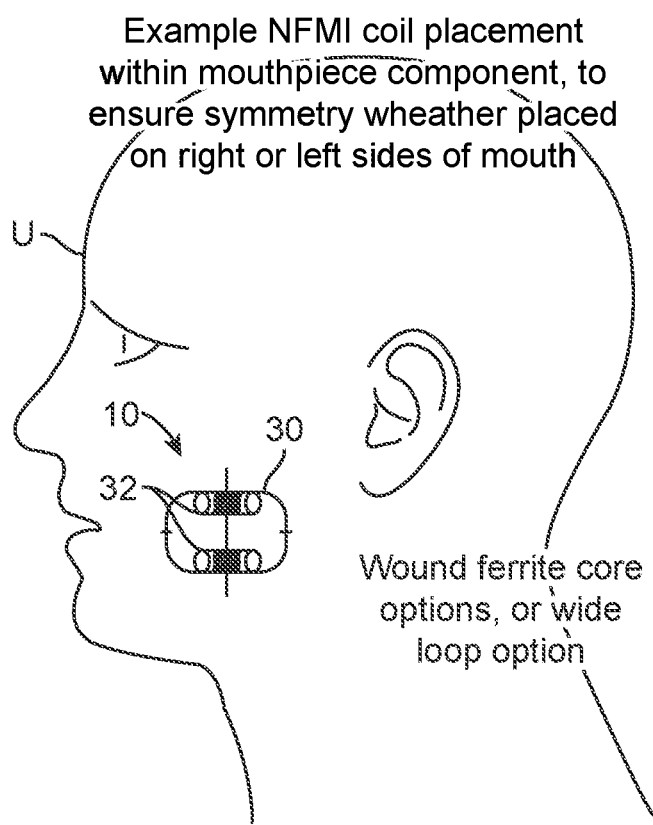
FIG. 2 shows a variation of a mouthpiece component having an integrated NFMI antenna/coil.

The mouthpiece component 10 can have an antenna (also referred to as a sensing mechanism) to receive signals/data (e.g., from the relay component 12). The sensing mechanism can be attached to or integrated with the mouthpiece component 10. The sensing mechanism can desirably allow the mouthpiece component 10 to receive data without a wire and can be, for example, a transducer, electrode, or other sensing mechanism that can function as an antenna. For example, the mouthpiece component 10 can receive data via body conducted signals (such that the body is the sensing mechanism, for example, the body can be an electrode), via acoustic signals sent at or above human hearing to a piezo transducer, via electromagnetically with an RF antenna, via a magnetic field with a loop/coil antenna. For example, using NFMI for the wireless link means the mouthpiece 10 is utilizing an integrated NFMI antenna/coil 32, as shown in FIG. 2. This may be completed through either a wire-wound ferrite core antenna, a wide loop option such as a larger loop coil 30, wire wound coils (e.g. ferrite backed inductive charge coils) or PCB coils. Regardless of implementation, one design consideration is the ability of the mouthpiece component 10 to work similarly whether placed on the right or left upper molars, with one face of the device maintained against the palate, as different users may require different sides depending on dental anatomy. This means NFMI coil/antenna 32 placement preference is somewhat symmetric, such as along the bottom or top edge of the mouthpiece 10. Asymmetric placement of the antenna, such as diagonal or vertical, may instead be utilized to improve coupling to the paired antenna, depending on orientation.

The integrated microphone 20 capability in the mouthpiece component 10 may be implemented with either, e.g., a MEMS-type air microphone or a PVDF film type vibrational sensor, as described in further detail below.

Figure 3A:
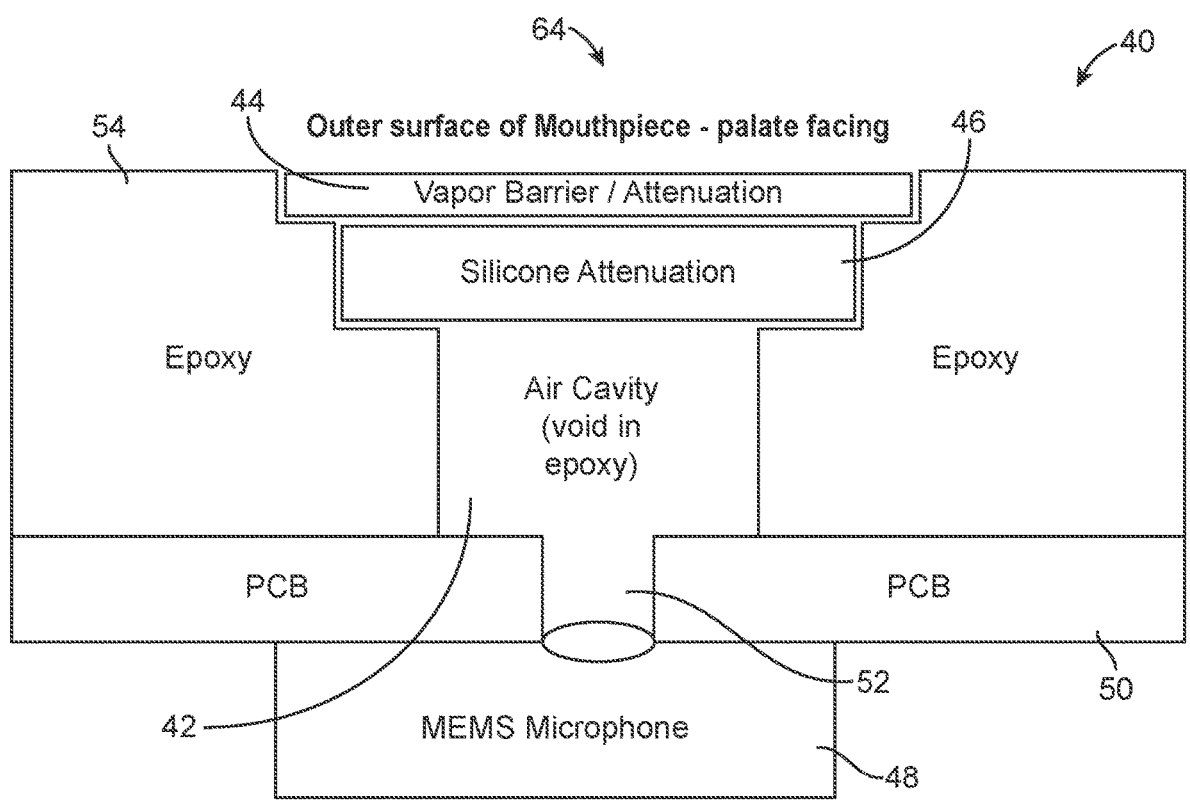
FIG. 3A shows a partial cross-sectional illustration of a variation of a MEMS-type microphone assembly securable within a user's mouth.

For a MEMS type microphone assembly 40, as shown in the partial cross-sectional illustration of FIG. 3A, the in-mouth sound pressure levels are high (e.g., up to ~150 dBSPL) necessitating audio attenuation as part of the microphone assembly to prevent clipping and distortion. MEMS type microphones also typically utilize the presence of a small air cavity 42, so this implementation may include a waterproof barrier 44 such as a tape or film as well as an attenuation element 46 such as a silicone disk, as part of the audio path to the air cavity 42 created for the microphone 48. The air cavity 42 may be formed in part by a first substrate 50, e.g., PCB defining an opening or channel 52 to the MEMS microphone 48, and a second substrate 54, e.g., housing structure formed from a material such as epoxy, which may form the sidewalls of the air cavity 42. A front port MEMS microphone mounted on the opposite side of the first substrate 50 may utilize the second substrate 54 to generate the walls of the air cavity. The attenuation element 46 may be mounted upon the second substrate 54 along with the barrier 44 positioned upon the attenuation element 46 and the second substrate 54, as shown. The portion of the assembly 40 upon which the barrier 44 is positioned may be positioned adjacent to the outer surface of the mouthpiece component 10, e.g., facing the palate of the user. MEMS microphones containing an integral waterproof barrier may preclude the use of a separate barrier 44, thus reducing overall size.

In order to handle the limited dynamic range of typical conventional MEMS microphones, the attenuation 46 added as part of the assembly 40 may be typically selected to still allow normal as well as low-voice speech levels, but enough attenuation such that loud talking or yelling will not be distorted, e.g., attenuation on the order of −30 dB is sufficient to prevent audio clipping. A good system level compromise will allow some distortion and clipping of sound pressure levels corresponding to the user screaming. This ensures the lower-end of the dynamic range will accept light talking down to whisper level audio.

The placement of the audio port 64 for a MEMS microphone 48 is desirably placed on a surface of the mouthpiece 10 which faces the palate, as this position is stable, is exposed to the highest speech sound levels, and does not get impacted by tongue and cheek movements during speech which can give rise to undesired audio artifacts. A tooth-facing position is also an acceptable alternative. It should be noted that due to an in-mouth MEMS microphone placement, the user's speech is loud so the signal-to-noise ratio (SNR) is large. External noise sources are dampened not only by the user's own cheeks and dental anatomy, but by the attenuation of the microphone assembly 40. This allows for clear recorded voice audio, down to whisper level, even in very loud external noise environments.

The microphone capability of the mouthpiece may also be implemented using, e.g., a polyvinylidene fluoride or polyvinylidene difluoride (PVDF) film vibrational sensor. This technique utilizes amplification circuitry to process the small signals output from the piezo-electric film material, as well as electrical shielding techniques to help reduce noise. The PVDF film material may be placed on an interior section of the mouthpiece enclosure, to pick up vibrations of the enclosure itself, as long as the film is backed either by air or a flexible material. Benefits of the PVDF film implementation may include a reduced implementation volume as well as inherently good noise shielding from the external environment as air-based incoming sound impinging on the user does not give rise to large physical vibrations inside the user's mouth. Both microphone implementation methods, therefore, provide the ability to issue clear audio transmissions with good SNR even in cases where the user is unable to hear themselves talk due to environmental noise conditions.

The microphone may utilize a means to detect onset of speech and enable a higher power transmit mode, thereby reducing energy usage between speech events. This capability may be integrated into the microphone IC or implemented in receive circuitry in the mouthpiece. Speech detection may be accomplished using time-based peak detection, signal integration/thresholding or frequency-based energy detection.

The mouthpiece 10 desirably provides a physical vibration drive onto the teeth to implement the bone conduction audio path previously described. This may be accomplished by using a piezo-electric material, e.g., with a piston-type interface to translate the small vibrations onto the surface of the tooth or teeth. Previous disclosures have detailed this interface and potential architecture options, as incorporated herein above, including simple beam with weights to reduce the mechanical resonant frequency, as well as a cantilever type configuration to again help lower the resonant frequency and also reduce the mechanical source impedance of the device to better translate power to the tooth. Additionally or alternatively, the mouthpiece 10 can have two actuators, located on either side of the mouth (e.g., both located on the left or right side of the mouth, or one located on the left side and one located on the right side), and provide "3D" or "directional" audio by slight timing differences/phasing between the two actuators. This can help to tell the difference between incoming audio from different radio sources in the case where the relay component 12 is connected to multiple infrastructure communication devices 14 at once. Additionally or alternatively, the mouthpiece component can be designed such that one actuator (e.g., a first actuator) can be on a left side of the mouth and such that one actuator (e.g., a second actuator) can be on a right side of the mouth. Additionally or alternatively, the mouthpiece component 10 can have multiple actuators located on one or both sides of the mouth (e.g., one actuator on a left side and two actuators on a right side).

The mouthpiece component 10 can be powered without a battery source. For example, the mouthpiece component 10 can be powered through the oscillations of a magnetic field as a means of live power transfer. For example, the mouthpiece component 10 can be powered with a wireless power transfer system. In this way, the mouthpiece component 10 can be a "passive" component without a battery source. Alternatively or additionally, the mouthpiece component 10 can have an internal power source. This may either include a replaceable battery or integrated rechargeable battery. The use of a rechargeable battery may allow the system to remain sealed and waterproofed without having to incorporate a separate waterproof compartment to allow for battery replacement. The method of recharging the internal battery may be either contact charging through exposed metal contact pins on the mouthpiece external surface, or through a wireless inductive or resonant charging technique. The wireless methods may allow for complete mouthpiece component sealing and less risk of leaks and fluid ingress. In order to make the inductive charging work for a device small enough to be worn in the mouth, certain design aspects may include creating a very tight coupling between the charger transmit coil and the mouthpiece receive coil. Distance between those coils are desirably minimized through design, and ferrite sheet backing material used to help reduce heat and again increase the coupling coefficient. The device is relatively small enough that a custom transmit coil made to match and align with the mouthpiece recharge coil is advantageous. Whether used for live power transfer or inductive charging, the mouthpiece charge coil may separately be utilized for wireless data transmission during device operation, thereby reducing the number of coils in the mouthpiece device.

The mouthpiece component 10 enclosure itself is desirably physically small but also very strong in order to ensure the internal components and battery are protected and safe even under potential bite-force of the user. To this end, the circuitry and battery may be encapsulated, e.g., with epoxy 54, as part of the design such that all of the potentially hazardous materials are completely encased in a bio-compatible material such as that used in pacemaker headers. A typical implementation would include the epoxy filling 54 of a bio-compatible plastic enclosure, but to reduce size even further the plastic enclosure may be skipped altogether and the epoxy 54 may be molded around the electronics in the desired component shape. This allows for tight control and small dimensions for the gap to a recharge coil, for instance. It also allows for the ability to create a small MEMS microphone air cavity 42 through the use of core pins during the epoxy mold process. This air cavity 42 may then be integrated with the aforementioned acoustic attenuation components. Top or bottom port MEMS microphones can be used along with this method.

Figure 3B:
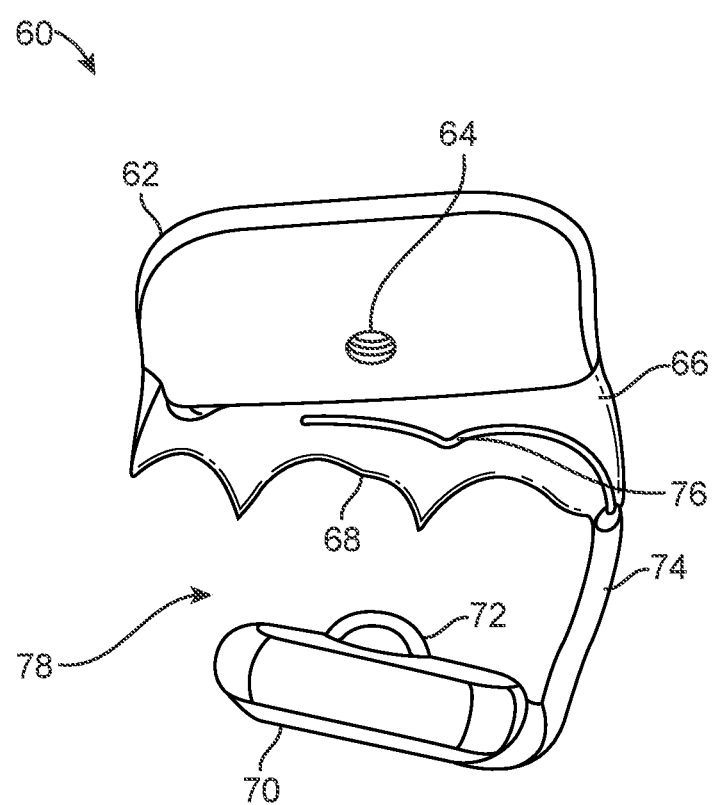
FIG. 3B shows a perspective assembly view of variation of the mouthpiece component of FIG. 1 that is securable within the mouth and upon one or more teeth of a user.

Lastly, the mouthpiece component 10 may be clamped to the user's tooth or teeth, e.g., upper back molars, using some clamping and fit mechanism, as illustrated in the perspective view of the mouthpiece component 60 shown in FIG. 3B. This is best done by having some portion of the mouthpiece be user-specific, and custom to their dental anatomy, to ensure the best clamp/retaining force, and to optimize comfort. The customized-portion of the mouthpiece may either be integrated into the mouthpiece assembly 10 as a single custom piece, or it may be separable such that the dental-adapter to the individual may be constructed separately than the mouthpiece electronics package, and the two parts mate together to create the overall mouthpiece system component.

As shown, the mouthpiece component 60 may include the microphone assembly housing 62 having a size configured for unobtrusively positioning within the user's mouth for extended periods of time, e.g., along the lingual or buccal surface(s) of one or more teeth, placed against the palate. The housing 62 may have a length of, e.g., 25 mm, and a height of, e.g., 15 mm, with the audio port 64 for a MEMS microphone (contained within the housing 62) defined along the side of the housing 62. The audio port 64 may be defined along the side of the housing 62 facing towards the palate when the component 60 is secured within the mouth, but in other variations, the audio port 64 may be defined at other locations such that it faces the teeth (either lingual or buccal surface) or the inner surface of the user's cheek.

In either case, the housing 62 may have a first portion of a conformable securement member 66, e.g., dental acrylic, attached along the side of the housing while a second portion of the conformable securement member 66 may define an interface 68 which is conformable to the patient's underlying dentition. Alternatively, the second portion of the conformable securement member 66 may instead be formed into a simplified configuration which is atraumatic and positionable against a variety of dentition. An actuator housing 70 having a contact portion 72 for placement against the surface(s) of the one or more teeth (e.g., within the interproximal space between teeth) may be positioned in apposition to the interface 68 such that a receiving region 78 is formed between the two within which the one or more teeth may be positioned.

The actuator housing 70 may contain at least some of the electronics and one or more actuators (e.g., actuators 18) which are configured to vibrate according to the signals received for transmitting auditory signals via vibrational conductance into the underlying surfaces of the one or more teeth in contact with the contact portion 72. The actuator housing 70 and contact portion 72 may be maintained in its position relative to the housing 62 via a connecting member 74, e.g., hypotube, which has an embedded portion 76 secured or otherwise attached within or to conformable securement member 66. The connecting member 74 may be flexible enough to allow the actuator housing 70 and assembly housing 62 to temporarily flex away from one another during securement of the assembly 60 upon the user's dentition as the tooth or teeth are positioned within the receiving region 78.

Yet when suitably positioned, the actuator housing 70 and contact portion 72 may clamp or otherwise become secured against the tooth or teeth, e.g., via an interference fit between the assembly 60 and the surfaces of the user's tooth or teeth. The connecting member 74 may be positioned, e.g., to extend proximally around the distal surface (i.e., opposite of the mesial surface) of the last positioned molar (i.e., third molar) so that the occlusal surfaces of the tooth or teeth remain free and unobstructed by the assembly 60.

The microphone can be configured to capture the user's speech for outgoing audio transmissions, can be configured to capture the user's speech for incoming audio transmissions (e.g., which may be useful, for example, in high noise environments to enable the user to more clearly hear their speech when they are communicating to another person or to a computer), or both. One or multiple actuators (e.g., 1 to 10 or more actuators, including every 1 actuator increment within this range, (e.g., 1 actuator, 2 actuators, 10 actuators)) can be configured to vibrate against a tooth or teeth to provide the user with incoming audio transmissions via bone conduction (also referred to as incoming sound transmissions via bone conduction). For example, the one or more actuators can be configured to vibrate against a tooth or teeth to provide the user with speech audio, non-speech audio (e.g., one or multiple tones, one or multiple notification tones), or both types of audio. The mouthpiece component can provide half-duplex communication, full duplex communication, or both types of communication.

The mouthpiece component can have one or multiple mouthpiece component portions, for example, a mouthpiece component first portion and a mouthpiece component second portion. For example, the mouthpiece component can have a mouthpiece component first portion (e.g., housing 62, housing 70) and a mouthpiece component second portion (e.g., housing 62, housing 70). The mouthpiece component first portion can have one or multiple microphones, one or multiple actuators, or both. The mouthpiece component second portion can have one or multiple microphones, one or multiple actuators, or both. The mouthpiece component first portion and the mouthpiece component second portion can be configured to be on opposite sides of the tooth or teeth when the mouthpiece component is secured to the tooth or teeth. The mouthpiece component first portion and/or the mouthpiece component second portion can be configured to contact the tooth or teeth when the mouthpiece is secured to the tooth or teeth. For example, the mouthpiece component portion which has the actuator can be configured to contact the tooth or teeth when the mouthpiece component is secured to the tooth or teeth. As another example, when the mouthpiece component is secured to the tooth or teeth, the mouthpiece component portion which has the microphone can be configured to contact the user's palate and the mouthpiece component portion which has the actuator can be configured to contact an inner surface of a cheek of the user, or vice versa. When the mouthpiece component is secured to the tooth or teeth, the mouthpiece component portion which has the actuator can be on a buccal side of the tooth or teeth and the mouthpiece component portion which has the microphone can be on a lingual side of the tooth or teeth. When the mouthpiece component is secured to the tooth or teeth, the mouthpiece component portion which has the actuator can be on a lingual side of the tooth or teeth and the mouthpiece component portion which has the microphone can be on a buccal side of the tooth or teeth. The mouthpiece component first portion can have a tooth contact portion configured to fit in an interproximal space between two adjacent teeth. The mouthpiece component second portion can have a tooth contact portion configured to fit in an interproximal space between two adjacent teeth. The mouthpiece component first portion can be coupled to the mouthpiece component second portion via a connector. The connector can extend partially or entirely around a posterior-most tooth of the tooth or teeth when the mouthpiece component is secured to the tooth or teeth.

The mouthpiece component can have a mouthpiece component first configuration and a mouthpiece component second configuration. The tooth or teeth of the user that the mouthpiece component can be attached to can be on a left side of the user's dentition, on a right side of the user's dentition, or on both sides. When the mouthpiece component is in the mouthpiece component first configuration, the mouthpiece component can be securable to the tooth or teeth on the left side of the user's dentition, on the right side of the user's dentition, or on both sides. When the mouthpiece component is in the mouthpiece component second configuration, the mouthpiece component can be securable to the tooth or teeth on the right side of the user's dentition, on the left side of the user's dentition, or on both sides. The mouthpiece component can be securable to the tooth or teeth of the user with an interference fit. When the mouthpiece component is secured to the tooth or teeth, occlusal surfaces of the tooth or teeth can remain unobstructed by the mouthpiece component.

The mouthpiece component can have a housing. The housing can have a housing first portion and a housing second portion. The housing first portion can have one or multiple microphones, one or multiple actuators, or both. The housing second portion can have one or multiple microphones, one or multiple actuators, or both. The housing first portion and the housing second portion can be configured to be on opposite sides of the tooth or teeth when the housing is secured to the tooth or teeth. The housing first portion and/or the housing second portion can be configured to contact the tooth or teeth when the housing is secured to the tooth or teeth. For example, the housing portion which has the actuator can be configured to contact the tooth or teeth when the housing is secured to the tooth or teeth. As another example, when the housing is secured to the tooth or teeth, the housing portion which has the microphone can be configured to contact the user's palate and the housing portion which has the actuator can be configured to contact an inner surface of a cheek of the user, or vice versa. When the housing is secured to the tooth or teeth, the housing portion which has the actuator can be on a buccal side of the tooth or teeth and the housing portion which has the microphone can be on a lingual side of the tooth or teeth. When the housing is secured to the tooth or teeth, the housing portion which has the actuator can be on a lingual side of the tooth or teeth and the housing portion which has the microphone can be on a buccal side of the tooth or teeth. The housing first portion can have a tooth contact portion configured to fit in an interproximal space between two adjacent teeth. The housing second portion can have a tooth contact portion configured to fit in an interproximal space between two adjacent teeth. The housing first portion can be coupled to the housing second portion via a connector. The connector can extend partially or entirely around a posterior-most tooth of the tooth or teeth when the housing is secured to the tooth or teeth.

The housing can have a housing first configuration and a housing second configuration. The tooth or teeth of the user that the housing can be attached to can be on a left side of the user's dentition, on a right side of the user's dentition, or on both sides. When the housing is in the housing first configuration, the housing can be securable to the tooth or teeth on the left side of the user's dentition, on the right side of the user's dentition, or on both sides. When the housing is in the housing second configuration, the housing can be securable to the tooth or teeth on the right side of the user's dentition, on the left side of the user's dentition, or on both sides. The housing can be securable to the tooth or teeth of the user with an interference fit. When the housing is secured to the tooth or teeth, occlusal surfaces of the tooth or teeth can remain unobstructed by the housing.

The one or more actuators can be configured to deliver vibration, receive vibration, or both.

Relay Component

Figure 4A:
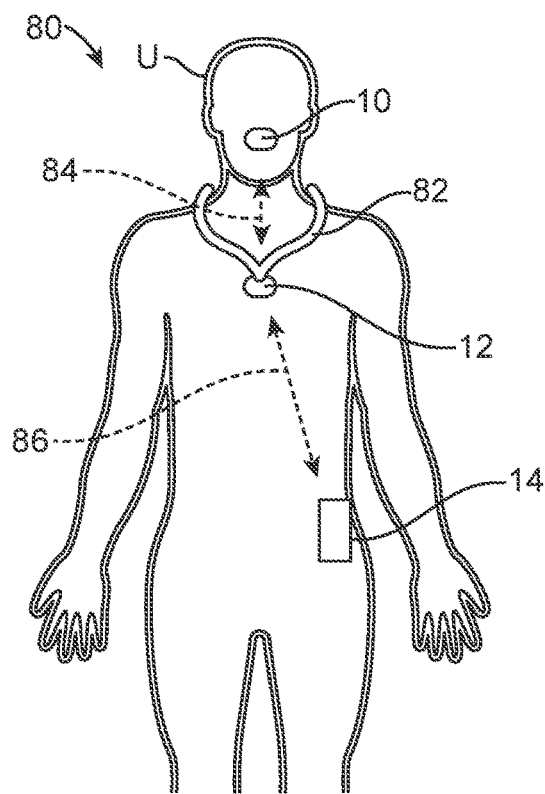
FIGS. 4A and 4B show schematic illustrations of variations of the two-way communication system of FIG. 1 where the mouthpiece component communicates with the infrastructure communications device via the relay component.

A second component of the communication system 80 may include the relay component where the relay component 12 of the communication system functions as an interface between the infrastructure communications device 14 (e.g., cell phone, walkie-talkie radios, intercom device, etc.) and the mouthpiece component 10, as shown in the illustrative drawing of FIG. 4A. The relay component 12 may convert the audio available at the infrastructure communication device into a wireless signal expected by the mouthpiece component 10, and vice-versa.

Depending on the wireless link type chosen between the mouthpiece component 10 and relay component 12, possible wireless links 84 between the mouthpiece component 10 and relay component 12 may include, e.g., Near Field Magnetic Induction (NFMI), body-conduction/body-network, a combination of these, or RF such as Bluetooth®. One link type is NFMI which enjoys relatively little attenuation through body tissue, and also has a low electromagnetic propagation for a low RF profile. For this implementation, the relay component 12 incorporates an inductive coil component which may be incorporated into the communications system. One variation may incorporate an antenna 82 configured as, e.g., a neck-loop or a patch-antenna. The direction of the magnetic field lines in relation to the mouthpiece antenna/coil, as illustrated in FIG. 2 above, may be taken into account when determining a location of the relay component NFMI antenna 82. For instance, neck-loop configurations may use a bolo-type cinching mechanism to tighten the loop around the neck and further has the benefit of changing the direction of the magnetic field lines, e.g., from forward tilting to more straight up towards the head which can give tighter coupling to the mouthpiece component 10 and a more robust wireless link. Loops may also be worn around the head of the user U and may be beneficial from this standpoint. Such loops may be integrated into any number of head-worn accessories, e.g., helmets, hats, etc. Neck-loops may also incorporate, e.g., a break-away connector feature for safety purposes.

Regardless of placement, it is advantageous to ensure there is some amount of separation between the antenna wire 82 and the human body (even if a few millimeters of separation), in order to preserve a higher Q (quality factor) of the antenna 82. In some variations, patch coils may be worn in various places but to ensure optimal field line position, the back of the neck or back of the head may work best. If NFMI is used at a fixed frequency, the magnetic field strength may be reduced in order to avoid user-to-user interference when multiple communication systems are worn in close proximity. Otherwise, time-sharing the bandwidth or utilizing dedicated frequency channels may be handled. For example, one relay component may be used as a network manager and use a time domain multiple access (TDMA) protocol to transfer data between different devices worn by multiple users in close proximity. As another example, one relay component may coordinate with its mouthpiece a transition to another open frequency when interference from a neighboring system is sensed.

The wireless link 84 to the mouthpiece component 10 may be encrypted to ensure secure communications, e.g., using AES-256 or another chosen encryption algorithm. If unique encryption key-exchange is required, this may be achieved through an exchange over NFC, NFMI or other close proximity-based method, between the mouthpiece component 10 and desired relay component 12, prior to use.

While the physical implementation of the relay component 12 may be a separate electronics enclosure with attached wireless link antenna to communicate with the mouthpiece component 10, other variations may have the relay component 12 physically mate and/or integrate with the infrastructure communication device 14 (described in further detail below). If the relay component 12 is a device physically separate from the infrastructure communication device 14, then a link 86 (either wired or wireless) may be established between the relay component 12 and infrastructure communication device 14. Since both devices would be outside of the body of the user, there are less restrictions on this link implementation, and protocols such as Bluetooth® or other RF communications may be used.

Figure 4B:
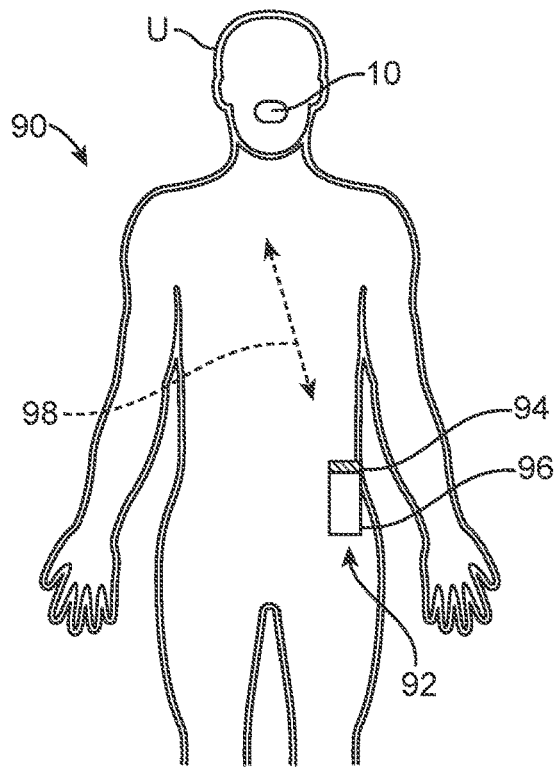

In the variation of the communication system 90 illustrated in FIG. 4B, the relay component 94 may be integrated into the infrastructure component 96, e.g., directly integrated, integrated into a case or housing such as a cell phone case, etc., such that a single integrated infrastructure communications device 92 may be used to communicate 98 wirelessly with the mouthpiece component 10.

Regardless of the specific chosen placement and implementation of the relay component 12, from a system level the relay component 12 may incorporate one or more processors for implementing digital signal processing (DSP) in order to minimize power consumption at the mouthpiece component 10. For a half-duplex system the DSP is not as critical as there is no feedback issue, but even basic filtering may be done at this point to save power.

Moreover, the relay component 12 may incorporate one or more user interface features which allow for the user U to interface with the system settings and modes, e.g., a push-to-talk (PTT) button for half-duplex audio communications and/or full-duplex communications (or to switch between half- and full-duplex communications), receive volume controls, etc. These controls may be integrated into the physical implementation of the relay component 12, or they may be separated out into a separate remote control with a new data link, such as Bluetooth® (e.g., Bluetooth® low-energy (BLE)), other RF link, an NFMI link, or simply a wired connection. An NFMI link which connects the relay component 12 with the remote control can desirably allow for better performance under water. Where an NFMI link is used with both the mouthpiece component 10 and the relay component 12, the mouthpiece and relay component NFMI links can each operate at a different frequency from one another, or the NFMI link for each can be time-shared/coordinated with each other such that a different frequency is not needed. For a wireless remote control, the implementation may be something physically similar to, e.g., a key-fob, to be worn in the pocket for easy concealment. More advanced devices could also provide system status information. Information sent to a smart watch would be one way to accomplish this.

The relay component 12 may either obtain power directly from the infrastructure communication device (if available), or be battery powered and require either battery replacements or recharge. An integrated rechargeable battery may be implemented for size reduction reasons. In order to recharge the device, one variation may utilize a break-away type feature of an NFMI neck-loop to access recharge contact pins, which are typically inaccessible during operation. In order to save power, when implementing a half-duplex system over a full-duplex infrastructure such as a cell phone, an audio-level sensor may be used to notify the system when it is able to transition into an idle mode (not actively transmitting or receiving audio).

Infrastructure Communication Device

As mentioned above, the communication system described may be used to interface with another infrastructure communication device such as a cell phone, radio, intercom device, etc. For wired connections to the relay component 12, audio in/out signals may be available, while wireless links such as Bluetooth® (e.g., Bluetooth® low-energy (BLE), other RF links, or NFMI links are also an option to use two-way audio data to shuttle between the relay component 12 and the infrastructure communication device 14. NFMI links can advantageously allow for under water usage. Where an NFMI link is used with both the relay component 12 and the infrastructure communication device 14, the relay component and infrastructure communication device NFMI links can each operate at a different frequency from one another, or the NFMI link for each can be time-shared/coordinated with each other such that a different frequency is not needed. If the device supports voice activated commands, these may be engaged using the audio over the described communication system components.

Additionally and/or optionally, the relay component 12 may also be implemented such that there are links to two or more separate infrastructure communication devices worn by the same user simultaneously (such as two radios used in tactical operations, to two different teams). Incoming audio is typically designated in current dual-communication systems by driving audio to either the right or left ear in a headset. For a system with a mouthpiece (e.g., a single mouthpiece), a pre-audio notification may be used to alert the user as to which device is the source of incoming audio. If a mouthpiece includes teeth-drive contact points on both the right and left sides of the mouth, audio may be phased to these drive points such that the perceived audio is coming from the right or left side.

Earpiece Component

Figure 5:
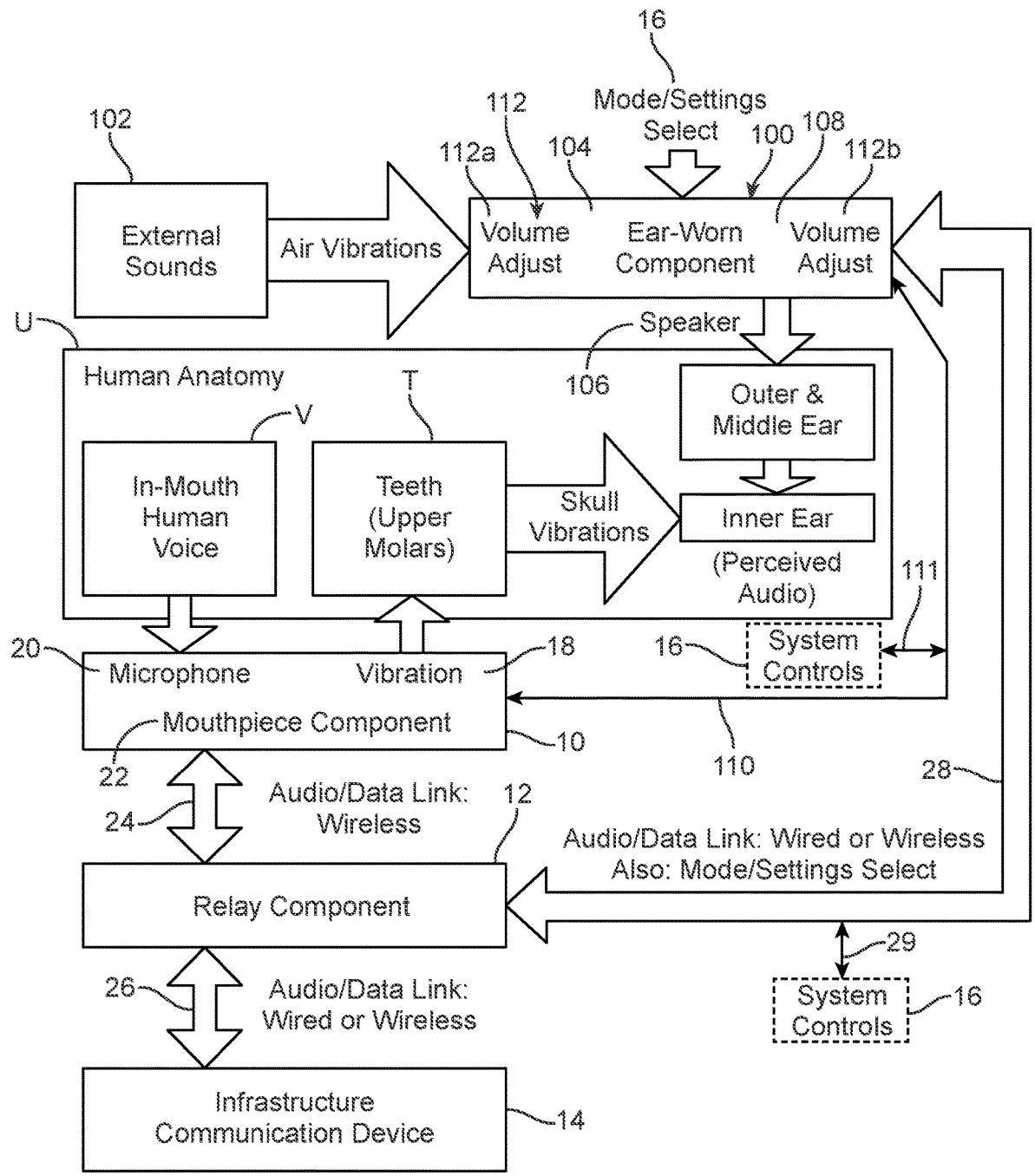
FIG. 5 shows a schematic representation of a variation of the two-way communication system of FIG. 1 with an earpiece component.

The system can optionally include an earpiece 100. For example, FIG. 5 illustrates that the two-way communication system can have one or multiple earpiece components 100 (e.g., 1, 2, 3, 4, 5, 6, 7, 8, 9, or 10 or more earpieces 100). When more than two earpieces 100 are used, these can be designed and used as back-up or replacement earpieces 100 to the one or two primary earpieces 100. The earpieces 100 are also referred to as earpiece components 100 throughout. The system can have a left earpiece component 100a and/or a right earpiece component 100b. As another example, the system can have one or multiple left earpiece components 100a (e.g., 1, 2, 3, 4, or 5 or more left earpiece components 100a) and/or can have one or multiple right earpiece components 100b (e.g., 1, 2, 3, 4, or 5 or more right earpiece components 100b), where the number of left and/or right earpiece components 100 beyond the first earpiece 100a or 100b on each side, i.e., the second, third, fourth, and fifth left and/or right earpieces 100, can be back-up or replacement earpieces 100 for the first and/or second earpiece components 100a, 100b. Each earpiece component 100 can be configured to be a communication device. Each earpiece component 100 can be capable of one-way or two-way communication. The system can provide half-duplex and/or full duplex communications. Each earpiece component 100 can be an assembly of multiple sub-elements that when assembled comprise an earpiece component 100.

Having multiple earpiece components 100 (e.g., 2 or more) can advantageously provide communication redundancy. Should an earpiece 100 malfunction or be destroyed during use, a user can quickly don a fully functional earpiece 100 with minimal delay and/or rely on the other functional earpiece component 100 in the other ear. Each earpiece component 100 can have one or multiple communication channels configured to transmit and/or receive sound at one or multiple frequencies, for example, behaving as base-band audio for analog variations or modulating higher frequencies and work digitally as well. The left and right earpieces 100a, 100b can have the same or different frequency channels relative to one another.

Each earpiece component 100 can be removably engageable with/to a user's ear. For example, the earpiece components 100 can be configured for temporary securement on/to a user's ears. One or more of the earpiece components 100 can be configured to fit partially or completely in an ear, for example, in at least a portion of an ear canal. For example, the earpiece components 100 can extend into about 1% to about 100% a length of the ear canal, for example, about 25%, about 33%, about 50%, about 67%, about 75%, or about 100% the full or half length of the ear canal. One or more of the earpiece components 100 can be configured to fit partially or completely over or behind an ear, for example, over at least a portion of an outer ear. For example, the earpiece components 100 can extend over about 1% to about 100% a surface of the outer ear, for example, about 25%, about 33%, about 50%, about 67%, about 75%, or about 100% the surface of the outer ear. In this way, each earpiece component 100 can be an in-the-ear earpiece component and/or an over-the-ear and/or a behind-the-ear earpiece component. The earpiece components 100 can have the same or different configurations from one another. For example, the left and right earpiece components 100a, 100b can both be an in-the-ear earpiece component and/or an over-the-ear earpiece component and/or a behind-the-ear earpiece component. As another example, the left earpiece component 100a can be an in-the-ear earpiece component and the right earpiece component 100b can be an over-the-ear or behind-the-ear earpiece component, or vice versa.

Each earpiece component 100 can be configured to fit in and/or on a left ear, a right ear, and/or both ears (separately or together). The earpiece components 100 can be foamies, can have tiered shapes, can have tapered shapes, can be custom in-ear inserts, can be ear-cups, or any combination thereof. The earpiece components 100 can be capable of, adapted to, and/or configured to receive sound. For example, foamies (and other material only earpiece components) can be capable of, adapted to, and/or configured to receive sound. The earpiece components 100 can be made from foam, silicone, acrylic, vinyl, rubber, plastic, or any combination thereof. One or more portions of the earpiece components 100 can be compressible and/or one or more portions of the earpiece components 100 can be incompressible. For example, electronic components in the earpieces 100 can be incompressible and the material(s) which encase the electronic components can be compressible and/or incompressible. The earpiece components 100 can have one or multiple noise reduction flanges, for example, 1-10 noise reduction flanges (e.g., 1, 2, 3, 4, 5, 6, 7, 8, 9, or 10 or more noise reduction flanges). The earpiece components 100 can be vented or non-vented. The one or more vents in a vented earpiece component 100 can have a vent opening and/or a passageway that has an adjustable or fixed geometry (e.g., the size of the vent opening and/or passageway can be increased and decreased). The earpiece components 100 can be disposable or reusable. The earpiece components 100 can be battery powered and/or wirelessly powered. The earpiece components 100 can have a rechargeable power source. The rechargeable power source can be recharged wirelessly or via direct contact with a recharge source. A connector can connect two or more earpieces 100 together. The connector can be an electrical connector (e.g., an insulated wire) or a non-electrical connector (e.g., a chord, a string, etc.).

The earpiece components 100 can be optionally configured to communicate with the environment, a user (e.g., one or both ears), one or more components of the system, or any combination thereof. The earpiece components 100 can be configured to receive and/or transmit sound and/or electronic signals that represent sound (also referred to as electronic sound signals, sound signals, audio signals, or variants thereof). For example, the earpiece components 100 can be configured to receive/transmit communications (e.g., sound waves and/or audio signals) from/to the environment, from/to the mouthpiece component 10, from/to the relay component 12, or any combination thereof. For example, the earpiece components 100 can receive audio signals from the environment and the relay component 12, and then transmit these received signals to the ear canal. In this way, the earpiece component 100 can be a one-way communication component such that the earpiece component 100 can provide incoming audio but not outgoing communications. For example, FIG. 5 illustrates that the earpiece components 100 can be configured to receive external sound 102 from the environment (also referred to as environmental sound or environmental noise), receive audio signals from the mouthpiece component 10, receive audio signals from the relay component 12, or any combination thereof. The sound and/or electronic sound signals that the earpiece components 100 receive is collectively referred to as incoming sound. The earpiece components 100 can provide the user with speech audio, non-speech audio (e.g., one or multiple tones, one or multiple notification tones), or both types of audio.

FIG. 5 further illustrates that each earpiece component 100 can have one or more earpiece microphones 104 and/or one or more earpiece speakers 106. The one or more microphones 104 can each be configured to pick up environmental sound 102. The picked up environmental sound 102 can be communicated to a user with or without being processed and/or with or without first (or at all) being converted into an electronic signal. Each of the one or more speakers 106 can be configured to emit sound received from an earpiece microphone 104, to emit sound that corresponds to the audio signals received from the mouthpiece component 10, to emit sound that corresponds to the audio signals received from the relay component 12, to cancel environmental sound 102, or any combination thereof.

FIG. 5 further illustrates that each earpiece component 100 can have a transmitter and/or a receiver such as an earpiece transceiver 108. The earpiece transceiver 108 can enable the earpiece components 100 to be in wireless communication with the mouthpiece component 10 and/or the relay component 12. The earpiece transceiver 108 can enable the earpiece components 100 to receive and/or transmit audio data from and/or to the mouthpiece component 10 and/or the relay component 12. Alternatively or additionally, the earpiece components 100 can be in wired communication with the relay component 12.

FIG. 5 further illustrates that the system can have a data link 28 (wired or wireless) between the earpiece components 100 and the relay component 12 (the data link 28 is also referred to as a relay component data link 28, communication link 28, or variants thereof). For example, the data link 28 (wired or wireless) can be established between the earpiece components 100 and the antenna/coil of the relay component 12. The data link 28 can electrically connect the earpiece components 100 to the relay component 12. The data link 28 (wired or wireless) can be used to get audio data to and/or from relay component 12. Audio signals can be transmitted over the data link 28. Control signals 16 can be transmitted over the data link 28. For example, the system can generate control signals 16 that can lower environmental audio levels when incoming audio is present. The control signals 16 can be associated with one or more controls. The controls, when toggled or otherwise controlled, can generate one or more control signals 16. The system can have one or more data links 28, for example, 1, 2, or more data links 28. For example, the system can have a first data link 28a (wired or wireless) between a first earpiece component 100a and the relay component 12 and a second data link 28b (wired or wireless) between a second earpiece component 100b and the relay component 12. The first and second earpiece components 100a, 100b can be left and right earpiece components, respectively, and the first and second data links 28a, 28b can be left and right data links, respectively. As another example, the system can have a single data link 28 (wired or wireless) between the left and right earpiece components 100a, 100b and the relay component 12.

FIG. 5 illustrates that the system can have a data link 110 between the earpiece components 100 and the mouthpiece component 10 (the data link 110 is also referred to as a mouthpiece data link 110, communication link 110, or variants thereof). The data link 110 can be a wireless data link. For example, the data link 110 can be established between the earpiece components 100 and the one or more coils 32 of the mouthpiece component 10. The data link 110 can electrically connect the earpiece components 100 to the mouthpiece component 10. The data link 110 can be used to get audio data to and/or from mouthpiece component 10. Audio signals can be transmitted over the data link 110. Control signals 16 can be transmitted over the data link 110 and/or over a data link 111. For example, the control signals 16 can directly interface with the earpiece components 100 via the data link 110 and/or via a separate data link 111 in communication with the data link 110 as shown in FIG. 5. The system can have one or more data links 110, for example, 1, 2, or more data links 110. For example, the system can have a first data link 110a between a first earpiece component 100a and the mouthpiece component 10 and a second data link 110b between a second earpiece component 100b and the mouthpiece component 10. The first and second earpiece components 100a, 100b can be left and right earpiece components, respectively, and the first and second data links 110a, 110b can be left and right data links, respectively. As another example, the system can have a single data link 110 between the left and right earpiece components 100a, 100b and the mouthpiece component 10.

FIG. 5 illustrates that the system can have one or more relay component data links 28 (e.g., first and second relay component data links 28a, 28b; left and right relay component data links 28a, 28b) and/or one or more mouthpiece component data links 110 (e.g., first and second mouthpiece component data links 110a, 110b; left and right mouthpiece component data links 110a, 110b).

FIG. 5 illustrates that the system controls 16 can interface with the relay component 12 via the data link 28 (wired or wireless). For example, the system controls 16 can interface directly with the data link 28 and/or via a separate data link 29 in communication with the data link 28 as shown in FIG. 5. Additionally or alternatively, the system controls 16 can interface with the mouthpiece component 10 via the data link 110. The system controls 16 can be electrically linked to the earpiece components 100, the mouthpiece component 10, the relay component 12, or any combination thereof. For example, FIG. 5 illustrates that the system controls 16 can be in communication with the relay component 12 and the earpiece components 100.

The communication link 28 between the earpiece components 100 and the relay component 12 can utilize any number of wireless data transmission protocols, for example, NFMI (digital and/or analog, with analog being, for example, either modulated or base-band audio (e.g., tele-coil)), RF such as BLUETOOTH®, body conduction, other wireless platforms (e.g., BT, BLE, custom ISM band), or any combination thereof. For example, the earpiece components 100 can be configured to wirelessly receive/transmit audio communications from/to the relay component 12 and/or the antenna/coil of the relay component 12 using analog NFMI. An analog NFMI protocol can utilize a base audio band and an inductively coupled signal. As another example, the earpiece components 100 can be configured to wirelessly receive/transmit audio communications from/to the mouthpiece component 10 using digital NFMI. Relative to analog NFMI, digital NFMI can allow for better audio control and encryption possibilities. For digital implementations of the communication link 28, the data (e.g., audio data) communicated between the earpiece components 100 and the relay component 12 can be encrypted to ensure security using, for example, AES-256 or other encryption standards.

The communication link 110 between the earpiece components 100 and the mouthpiece component 10 can utilize any number of wireless data transmission protocols, for example, NFMI (digital and/or analog), RF such as BLUETOOTH®, body conduction, other wireless platforms (e.g., BT, BLE, custom ISM band), or any combination thereof. For example, the earpiece components 100 can be configured to wirelessly receive/transmit audio communications from/to the mouthpiece component 10 using analog NFMI (e.g., with sensitive and noise free circuitry). An analog NFMI protocol can utilize a base audio band and an inductively coupled signal. As another example, the earpiece components 100 can be configured to wirelessly receive/transmit audio communications from/to the mouthpiece component 10 using digital NFMI. Relative to analog NFMI, digital NFMI can allow for better audio control and encryption possibilities. For digital implementations of the communication link 110, the data (e.g., audio data) communicated between the earpiece components 100 and the mouthpiece component 10 can be encrypted to ensure security using, for example, AES-256 or other encryption standards.

One or multiple earpiece components 100 can be configured with analog and digital NFMI for wireless communication with the relay component 12, the antenna/coil of the relay component 12, the mouthpiece component 10, the mouthpiece coil(s) 32, or any combination thereof. This can advantageously provide communication redundancy in the event of equipment malfunction. Digital NFMI can be the default wireless communication protocol and analog NFMI can be the backup wireless communication protocol, or vice versa. The analog NFMI and digital NFMI communication links can be simultaneously or separately activated and/or deactivated. For example, the analog NFMI link can be configured to be activated only when the digital NFMI link is turned off, is not functional, or has an error rate greater than a threshold error rate, or vice versa. Additionally or alternatively, when the analog and digital NFMI communication links are simultaneously activated, the earpiece components 100 can be configured to wirelessly communicate with the relay component 12, the antenna/coil of the relay component 12, the mouthpiece component 10, the mouthpiece coil(s) 32, or any combination thereof using digital NFMI but not analog NFMI unless the digital NFMI link is turned off, is not functional, or has an error rate greater than a threshold error rate, or vice versa. A user can manually toggle between the analog and digital NFMI protocols and/or the system can automatically toggle between the analog and digital NFMI protocols, for example, upon detecting that communications have degraded.

The left earpiece component 100a can be configured to wirelessly communicate with the relay component 12, the antenna/coil of the relay component 12, the mouthpiece component 10, the mouthpiece coil(s) 32, or any combination thereof using analog NFMI and the right earpiece component 100b can be configured to wirelessly communicate with the relay component 12, the antenna/coil of the relay component 12, the mouthpiece component 10, the mouthpiece coil(s) 32, or any combination thereof using digital NFMI, or vice versa.

The left earpiece component 100a can be configured to be in wired communication with the relay component 12 and/or the antenna/coil of the relay component 12 and the right earpiece component 100b can be configured to wirelessly communicate with the relay component 12, the antenna/coil of the relay component 12, the mouthpiece component 10, the mouthpiece coil(s) 32, or any combination thereof using NFMI (digital and/or analog), or vice versa. The left and right earpiece components 100a, 100b can be configured to be in wired communication with the relay component 12 and/or the antenna/coil of the relay component 12.

The earpiece components 100 can provide passive and/or active noise protection (also referred to as hearing protection). Passive noise protection is sound reduction that does not use a power source. Active noise protection is sound reduction that uses a power source. The earpiece components 100 can be made of one or more passive hearing protection (e.g., noise control) materials, for example, sound-damping material, sound-absorbing material, sound-reflecting material, sound-diffusing material, or any combination thereof. The earpiece components 100 can have one or multiple passive and/or active filters. Passive filters can have one or more passive circuit components (e.g., resistors, capacitors, inductors) or can have no circuit components. Active filters can have one or more active circuit components (e.g., op amps). For example, the earpiece components 100 can have one or multiple mechanical filters, electronic filters, digital filters, or any combination thereof. Such filters can provide passive and/or active noise protection. For example, the mechanical filters can provide passive hearing protection, the digital filters can provide active hearing protection, and the electronic filters can provide passive and/or active hearing protection.

The earpiece components 100 can actively and/or passively dampen (also referred to as attenuate) sound, for example, environmental noise 102. The earpiece components 100 can actively and/or passively dampen electronic sound signals, for example, audio signals received from the mouthpiece component 10 and/or the relay component 12. The earpiece components 100 can be configured to dampen one or multiple sound wave frequencies. The earpiece components 100 can be configured to dampen one or multiple sound wave frequency bands (also referred to as ranges). The earpiece components 100 can be configured to dampen any sound wave frequency and/or frequency range within and/or outside the limits of human hearing, as different users may have different sensitivities to sound, different environments may have widely varying noise conditions and/or impulse events, and sounds outside a user's perception may still be at harmful pressures that should be attenuated. For example, the earpiece components 100 can be configured to dampen any sound wave frequency and/or frequency range within or bounded by the following spectrums: from about 0 Hz to about 40,000 Hz, more narrowly from about 0 Hz to about 35,000 Hz, yet more narrowly from about 0 Hz to about 20,000 Hz, including, for example, every 1 Hz frequency increment within these spectral ranges, and every frequency band within these spectral ranges of about 10 Hz, about 100 Hz, about 1,000 Hz, about 5,000 Hz, about 10,000 Hz, about 15,000 Hz, or any combination thereof.

The earpiece components 100 can be configured to dampen sound waves independent of frequency and/or can be configured to dampen sound waves dependent on frequency. The earpiece components 100 can be configured to dampen sound waves uniformly or non-uniformly across a sound's spectral composition (also referred to as its frequency domain).

The earpiece components 100 can have one or more low-pass filters, high-pass filters, band-pass filters, band-reject filters, notch filters, comb filters, all-pass filters, impulse noise filters, equalizers, compressors, or any combination thereof to achieve the desired damping profile and/or damping effect. For example, the earpiece components 100 can be configured to dampen soft noises and/or loud noises. Soft noises can be dampened the same or a different amount than loud noises. For example, soft noises can be dampened less than, the same as, or more than loud noises. Similarly, loud noises can be dampened less than, the same as, or more than soft noises. The earpiece components 100 can provide impulse noise protection, for example, with one or more impulse noise filters. The one or more filters used for damping can be passive and/or active filters.

The system can use higher-than-human-hearing frequencies to send data (such as control data) to the earpieces 100. Such signals can be sent using analog NFMI (e.g., from the relay component 12), and is a way for analog base-band NFMI earpieces 100 to receive control signals from the relay component 12. A filter inside the earpiece 100 can isolate the signals at the high audio frequency (i.e., at the frequency or frequencies at higher-than-human-hearing levels). The system can use such isolated signals as control signals. For example, a 25 kHz tone can be sent along with the audio, which when present can tell the earpiece 100 to reduce the volume of external sounds to allow the user to concentrate on the incoming audio communications. The relay component 12 can send the 25 kHz tone and the audio.

The earpiece components 100 can analyze an incoming spectral audio band to determine which frequencies to attenuate. The earpiece components 100 can attenuate frequencies that have an amplitude or average amplitude that is greater than or equal to an amplitude threshold. The earpiece components 100 can determine which frequencies are loud and which frequencies are soft. Soft noises can have a first amplitude or first average amplitude less than a first amplitude threshold and loud noises can have a second amplitude or second average amplitude greater than or equal to a second amplitude threshold. The first and second amplitude thresholds can be the same or different from one another.

The earpiece components 100 can be configured to amplify one or more sounds and/or electronic sound signals by amplifying one or more sound frequencies and/or frequency ranges. For example, the earpiece components 100 can be configured to amplify soft noises and/or loud noises. Soft noises can be amplified the same or a different amount than loud noises. For example, soft noises can be amplified less than, the same as, or more than loud noises. Similarly, loud noises can be amplified less than, the same as, or more than soft noises.

The earpiece components 100 can provide dynamic range compression, for example, with one or more compressors. The one or more compressors can be configured to reduce the level (also referred to as volume) of sound or an audio signal that has an amplitude that exceeds a downward compression threshold and/or can be configured to increase the level (also referred to as volume) of sound or an audio signal that has an amplitude that falls below an upward compression threshold. The downward compression threshold can be about −100 dB to about 200 dB, for example, about −50 dB. The upward compression threshold can be about −100 dB to about 200 dB, for example, 110 dB. The downward compression threshold can be the same or different from the upward compression threshold. For example, the downward and upward compression thresholds can be about −50 dB and about 50 dB, respectively. As another example, the downward and upward compression thresholds can be about −110 dB and about 110 dB, respectively.

The earpiece components 100 can have one or multiple attenuation level settings. The attenuation level settings can comprise one or multiple discreet levels or a continuously adjustable level across an attenuation level spectrum. For example, the earpiece components 100 can have 1-5 attenuation levels (e.g., 1, 2, 3, 4, or 5 attenuation levels), or can range continuously from a minimum level to a maximum level across an attenuation level spectrum. The attenuation level spectrum and/or attenuation levels can be static or can be automatically adjusted based at least partly on the sound and/or sound signals received by the earpiece components 100. The one or multiple attenuation level settings can correspond to one or multiple impulse protection levels. The impulse protection level(s) can remain at the level for safe hearing regardless of any volume and/or attenuation settings of any component of the system.

The earpiece components 100 can have one or more controls (e.g., one or more multi-state controls) that can be manually or automatically manipulated to adjust the attenuation level, for example, from a first attenuation level setting to a second attenuation level setting. The controls can be one or more manipulatable mechanisms, for example, buttons, switches, knobs, or any combination thereof. The manipulatable mechanisms can be translatable and/or rotatable. The controls can be one or more touch screens or touch surfaces. The controls can be one or more voice controls (e.g., voice control interfaces) that can receive user commands (e.g., "increase attenuation," "decrease attenuation," "amplify frequency," "dampen frequency," "turn on," "turn off"). The earpiece components 100 can receive a voice command, for example, from the mouthpiece components 10, from the relay component 12, and/or from the earpiece components 100 (e.g., as an environmental sound). A user can adjust the attenuation setting between the different levels and/or continuously across the attenuation level spectrum, for example, by manually adjusting/using one or more of the controls, touch screen/surface controls, voice controls, or any combination thereof. Additionally or alternatively, one or more of the controls (e.g., all of the controls) can be dictated over a wireless link to the relay component 12.

The earpiece components 100 can be configured to automatically adjust the attenuation setting between the different levels and/or continuously across the attenuation level spectrum based at least partly on the environmental noise and/or sound signals received.

The earpiece components 100 can be configured to dynamically adjust the attenuation of environmental sounds when provided one or more status signals (e.g., to increase attenuation when incoming communications are occurring to either the earpiece component 100 or the mouthpiece component 10). The earpiece components 100 can be configured to sense a status signal and thereafter dynamically adjust the attenuation of the environmental sounds being received. The status signal can be a wireless or wired status signal. The status signal can be, for example, a power signal (e.g., a digital signal decoded from a wireless link) from the earpiece components 100 and/or a signal that corresponds to when the wired or wireless earpiece components are connected to the system.

The earpiece components 100 can have one or multiple gain level settings. The gain level settings can comprise one or multiple discreet levels or a continuously adjustable level across a gain level spectrum. For example, the earpiece components 100 can have 1-5 gain levels (e.g., 1, 2, 3, 4, or 5 gain levels), or can range continuously from a minimum level to a maximum level across the gain level spectrum. The gain level spectrum and/or gain levels can be static or can be automatically adjusted based at least partly on the sound and/or sound signals received by the earpiece components 100.

The earpiece components 100 can have one or more controls (e.g., one or more multi-state controls) that can be manually or automatically manipulated to adjust the gain level, for example, from a first gain level setting to a second gain level setting. The controls can be one or more manipulatable mechanisms, for example, buttons, switches, knobs, or any combination thereof. The manipulatable mechanisms can be translatable and/or rotatable. The controls can be one or more touch screens or touch surfaces. The controls can be one or more voice controls (e.g., voice control interfaces) that can receive user commands (e.g., "increase gain," "decrease gain," "amplify frequency," "dampen frequency," "turn on," "turn off"). The earpiece components 100 can receive a voice command, for example, from the relay component 12 and/or from the earpiece components 100 (e.g., as an environmental sound). A user can adjust the gain setting between the different levels and/or continuously across the gain level spectrum, for example, by manually adjusting/using one or more of the controls, touch screen/surface controls, voice controls, or any combination thereof.

A user can manually adjust the gain setting between the different levels and/or continuously across the gain level spectrum. The earpiece components 100 can automatically adjust the gain setting between the different levels and/or continuously across the gain level spectrum based at least partly on the environmental noise received.

The earpiece components 100 can be configured to automatically adjust the gain setting between the different levels and/or continuously across the gain level spectrum based at least partly on the environmental noise and/or sound signals received. The earpiece components 100 can be configured to dynamically adjust the gain of environmental sounds when provided with one or more status signals (e.g., to decrease gain when a noise impulse event or a high external noise level is detected). The earpiece components 100 can be configured to sense a status signal and thereafter dynamically adjust the gain of the environmental sounds being received. The status signal can be a wireless or wired status signal.

The earpiece components 100 can have one or multiple volume level options for incoming communications. The earpiece components 100 can have a continuously adjustable volume level that can range from a minimum volume (e.g., no sound) to a maximum volume for incoming communications. The incoming communications can be environmental noise and/or sound signals received from the mouthpiece component 10 and/or the relay component 12. FIG. 5 illustrates that the earpiece can have one or more volume controls 112. For example, the earpiece components 100 can have a first volume control 112*a* to adjust the volume of external sound 102 and a second volume control 112*b* to adjust the volume of the sound received from the relay component 12, the antenna/coil of the relay component 12, the mouthpiece component 10, the mouthpiece coil(s) 32, or any combination thereof.

The volume controls 112 can be one or more manipulatable mechanisms, for example, buttons, switches, knobs, or any combination thereof. The manipulatable mechanisms can be translatable and/or rotatable. The volume controls 112 can be one or more touch screens or touch surfaces. The volume controls 112 can be one or more voice controls (e.g., voice control interfaces) that can receive user commands (e.g., "increase volume," "decrease volume," "amplify frequency," "dampen frequency," "turn on," "turn off"). A user can adjust the volume between the different volume levels and/or continuously from a minimum volume (e.g., no sound) to a maximum volume, for example, by manually adjusting/using one or more of the controls, touch screen/surface controls, voice controls, or any combination thereof.

The one or more controls 112 can control the attenuation levels, gain levels, volume levels, or any combination thereof. The one or more controls 112 are also referred to as a control interface 112, as the controls 112 can take myriad forms. The controls/control interfaces 112 can receive the system control signals 16. The system controls 16 can include any controllable parameter of the system, for example, the attenuation levels, gain levels, volume levels, or any combination thereof.

The earpiece components 100 can provide passive noise isolation by physically interfering with (also referred to as blocking) environmental noise, for example, by absorbing and/or reflecting environmental noise.

The earpiece components 100 can provide active noise cancellation by electronically canceling environmental noise. For example, the earpiece components 100 can be configured to analyze incoming sound and emit a reverse-phase audio that cancels the incoming sound via destructive interference.

The earpiece components 100 can improve a user's ability to communicate in, for example, high noise environments given that the earpiece components 100 can protect a user's hearing, dampen sound, pass-through sound, amplify sound, or any combination thereof as described above.

FIG. 5 illustrates that a user can wear the earpiece components 100 in addition to or in lieu of the mouthpiece component 10. The simpler configurations of the communication system involve either no earpiece component 100 (open-ears) or various forms of passive or active hearing protection without integrated communications (e.g., the passive earpiece components 100 described herein). The open-ears option is illustrated in FIG. 1 and has the advantage of non-visibility to an outside observer.

The hearing protection options all increase the visibility of the system, but have the advantage of reducing the distraction of competing audio inputs to the brain. By damping environmental noise, the user is able to more easily focus on the incoming audio through the teeth (via the mouthpiece 10), while simultaneously protecting their own hearing from loud environments. Clear communications are therefore possible in two directions, even in very loud environments, with minimal weight on the head (e.g., as compared to over-ear cups).

Once incoming communications are incorporated into the ear-worn components 100 as shown in FIG. 5, the benefits of the system are even greater (e.g., as compared to systems with earpiece components 100 without integrated communications). The hearing-protection benefits still exist, as outlined above, but in addition, the audio volume provided by the ear-component is able to exceed the maximum perceived audio level achieved by applying vibrations to the teeth at a comfortable level. This allows for increased SNR for received audio communications when in an extremely loud environment. For a wired connection to the ears, the audio may be routed automatically through the wire upon detection of a cable connection, and routed to the mouthpiece otherwise, for simplicity of use.

Another desirable feature of systems with ear-worn components 100 with integrated communications is that they can be capable of full-duplex operation (e.g., in addition to half-duplex operation), where the user can listen to incoming audio while transmitting simultaneously. The fact that audio would be going to the ears and the speech coming from the mouth means there is essentially no feedback issue to contend with, which is a technical obstacle that must be overcome to achieve full-duplex operation with just a mouthpiece based audio interface.

An additional benefit comes from switching from wired to wireless ear-worn components 100 with active received audio capability. Reduction in wires and cable management needs is a benefit as well. To allow for this, the ear-worn components 100 can implement a wireless method of audio communications, and the relay component 12 of the system can support it. This may be done using various wireless protocols such as BT, BLE, or custom ISM band, but most simply by using analog NFMI and a base-band audio signal sent over the magnetic field from a neck-loop as described above.

If analog NFMI ear-worn components 100 are implemented along with a digital NFMI connection to the mouthpiece 10, both analog and digital NFMI may be integrated into the same physical neck-loop, by either having separate loop wires or the same wires used at two different frequencies. If both mouthpiece and ear-components 100 use digital NFMI, the system may also use a single neck-loop antenna as long as the digital wireless signals are coordinated between the relay component 12, mouthpiece component 10, and ear-worn components 100. Digital NFMI signals may also be used to communicate settings/mode changes in the ear-worn component from the relay component 12 of the system.

If analog NFMI ear-worn components 100 are used that do not have additional integration capabilities, the system can provide means to switch between locations of received audio (ears or mouth) by a switch or other interface on, for example, the relay component 12 (e.g., either a box or antenna portion).

Using ear-worn components 100 that integrate communication provide various system benefits. For example, using ear-worn components 100 with integrated communication gives the user and/or system the ability to dynamically optimize the balance between situational awareness and communications. Outside sounds can be passed through or even enhanced, and then attenuated when communications are incoming. This is beneficial regardless of whether the incoming audio is through the ears or teeth, so as to reduce environmental distraction. As another example, the earpiece components 100 can give users the ability to quickly transition from a low-visibility communications setup to a kinetic/tactical operation by simply donning the ear-component 100 of the system. That act simultaneously provides needed hearing protection during a kinetic operation, as well as enabling the additional incoming audio pathway with higher volume capabilities on receive audio to help overcome loud environmental noise that comes along with the kinetic operation. As yet another example, the earpiece components 100 enable full-duplex audio communications (e.g., in addition to half-duplex communications), allowing receipt of audio while the user is transmitting simultaneously.

Figure 6A:
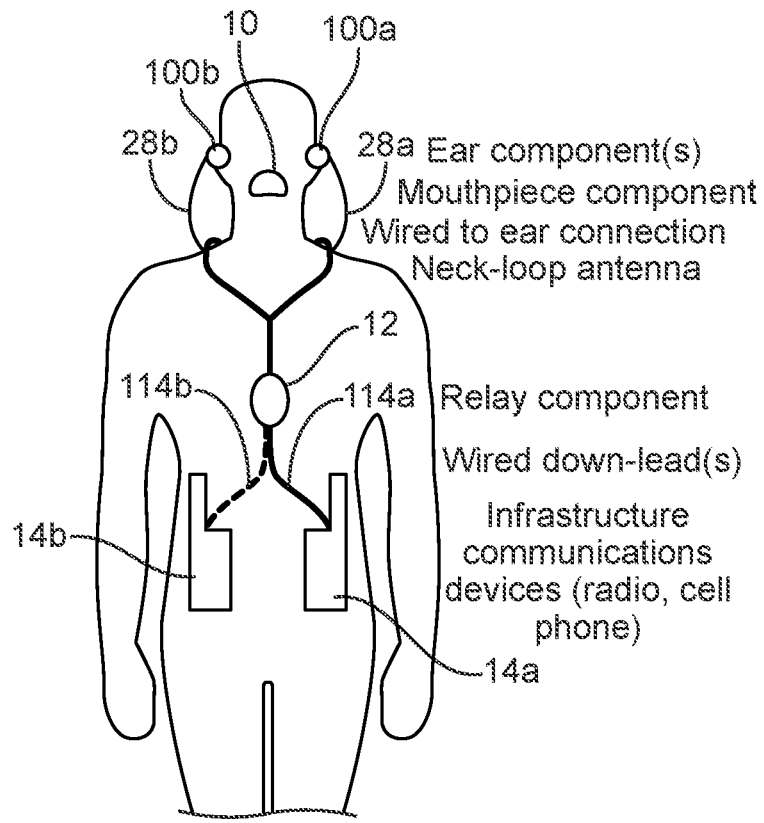
FIG. 6A shows a schematic illustration of a variation of the two-way communication system of FIG. 5 where the earpiece component is in wired communication with the relay component and where the relay component is in wired communication with the infrastructure communications device.

FIG. 6A illustrates a wired system. As shown, the earpiece components 100 can be in wired communication 28 with the relay component 12, for example, the antenna/coil of the relay component 12. For example, FIG. 6A illustrates that the left and right earpieces 100a, 100b can be connected to the antenna/coil of the relay component 12 with left and right wired communication links 28a, 28b, respectively.

FIG. 6A illustrates that the relay component 12 can be in wired communication 114 with one or more infrastructure communication devices 14 (e.g., radio, cell phone). For example, FIG. 6A illustrates that a first wired communication link 114a can connect the relay component 12 to a first infrastructure communication device 14a and that a second wired communication link 114b can connect the relay component 12 to a second infrastructure communication device 14b.

Figure 6B:
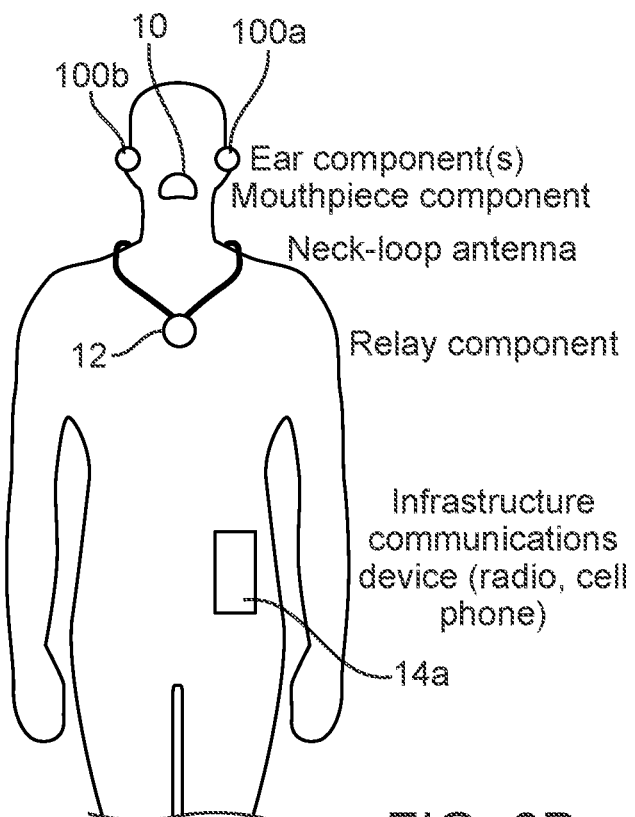
FIG. 6B shows a schematic illustration of a variation of the two-way communication system of FIG. 5 where the earpiece component is in wireless communication with the relay component and where the relay component is in wireless communication with the infrastructure communications device.

FIG. 6B illustrates a wireless system. As shown, the earpiece components are wirelessly connected via one or more wireless links 28 to the relay component 12, for example, the antenna/coil of the relay component 12. For example, FIG. 6B illustrates that the left and right earpieces 100a, 100b can be connected to the antenna/coil of the relay component 12 with left and right wireless communication links 28a, 28b, respectively.

FIG. 6B illustrates that the relay component 12 can be in wireless communication 114 with one or more infrastructure communication devices 14 (e.g., radio, cell phone). For example, FIG. 6B illustrates that a first wireless communication link 114a can connect the relay component 12 to a first infrastructure communication device 14a and that a second wireless communication link 114b can connect the relay component 12 to a second infrastructure communication device 14b.

FIGS. 6A and 6B each illustrate that the earpiece components 100 can be wirelessly connected via one or more wireless links 110 to the mouthpiece component 10, for example, using NFMI (digital and/or analog).

Figure 7:
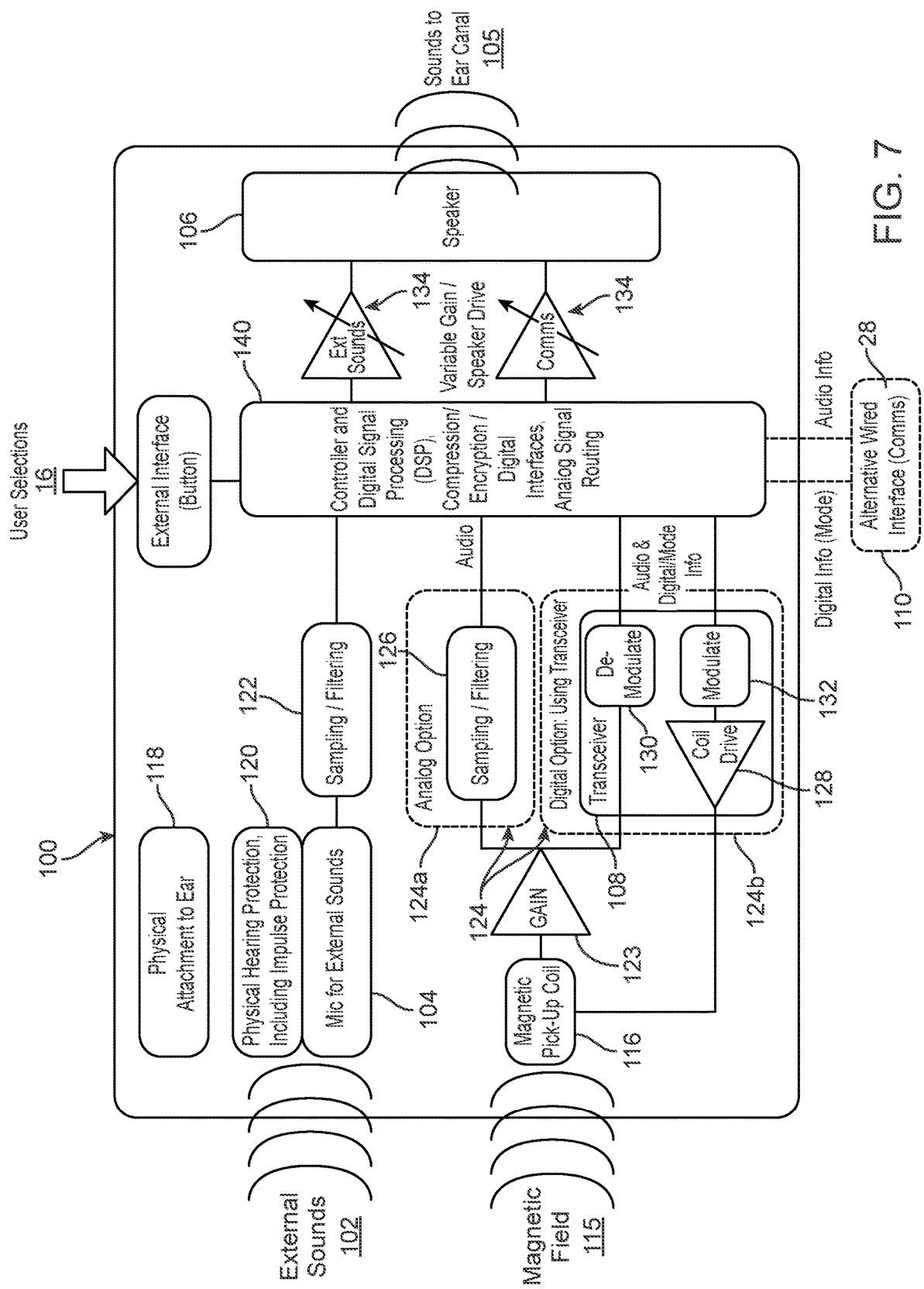
FIG. 7 shows a schematic representation of a variation of the earpiece component of FIG. 5.

FIG. 7 illustrates a schematic variation of an earpiece component 100 capable of intra-system communication. The earpiece component 100 can also be capable of two-way communication. FIG. 7 illustrates that each earpiece component 100 can have one or more earpiece microphones 104, one or more earpiece speakers 106, one or more earpiece wireless components 116, or any combination thereof, for example, in the arrangement shown. The earpiece microphones 104 can receive external sounds 102. The earpiece speakers 106 can emit sounds 105, for example, into an ear canal. The earpiece wireless components 116 can receive signals 115 from the relay component 12, the antenna/coil of the relay component 12, the mouthpiece component 10, the coil(s) 32 of the mouthpiece component 10, or any combination thereof. The signals 115 can be in the form of a magnetic field and be communicated to the earpiece wireless component 116, for example, via the antenna/coil of the relay component 12 and/or the coil(s) 32 of the mouthpiece component 10. Each of the earpiece microphone 104, the earpiece speaker 106, and/or the earpiece wireless component 116 can be attached to or integrated with the earpiece components 110, for example, attached to, positioned in, or integrated within an earpiece housing (not shown).

Each earpiece wireless component 116 can be one or more antennas and/or coils. The earpiece antennas/coils 116 can be magnetic pick-up antennas/coils. For example, the earpiece antennas/coils 116 can be NFMI antennas/coils 116

(e.g., a wire-wound ferrite core antenna and/or a wide loop option such as a loop coil). The earpiece antennas/coils 116 can enable the data links 28, 110 described above. The earpiece antennas/coils 116 can be attached to and/or integrated with the earpiece components 100.

FIG. 7 further illustrates that the earpiece components 100 can be physically attached 118 to one or both ears. FIG. 7 further illustrates that the earpiece components 100 can provide hearing protection 120 as described above, for example, physical hearing protection such as impulse protection. The hearing protection 120 provided can be passive and/or active as described above.

FIG. 7 further illustrates that the sound received by the one or more microphones 104 can be sampled and/or filtered 122 before being communicated/sent to a controller 140.

FIG. 7 further illustrates that the signals 115 received by the one or more wireless components 116 can be processed 124 before being sent to the controller 140. For example, the audio signals 115 can undergo analog processing 124*a* and/or digital processing 124*b*. FIG. 7 further illustrates that the audio signals 115 can be amplified 123 prior to being processed 124 and sent to the controller 140.

The analog processing 124*a* can include one or more sampling and/or filtering components 126. The digital processing 124*b* can include one or more earpiece transceivers 108, one or more coil drives 128, one or more de-modulators 130, one or more modulators 132, or any combination thereof. The signal output from the processing 124 can be sent to the controller 140. The controller 140 can perform digital signal processing (DSP), compression, encryption, digital interfaces, analog signal routing, or any combination thereof on the various audio signals received. FIG. 7 further illustrates that the controller 140 can be configured to receive audio signals from the earpiece microphones 104, from the wireless components 116, from the controls/control interfaces 112, from wired communication links (e.g., wired data link 28 and/or wired data link 110), or any combination thereof.

The controller 140 can send output signals to the earpiece speaker 106. One or more variable gain and/or speaker drives 134 can process the controller output signals. The earpiece speaker 106 can convert the controller output signals to sound 105.

Figure 8:
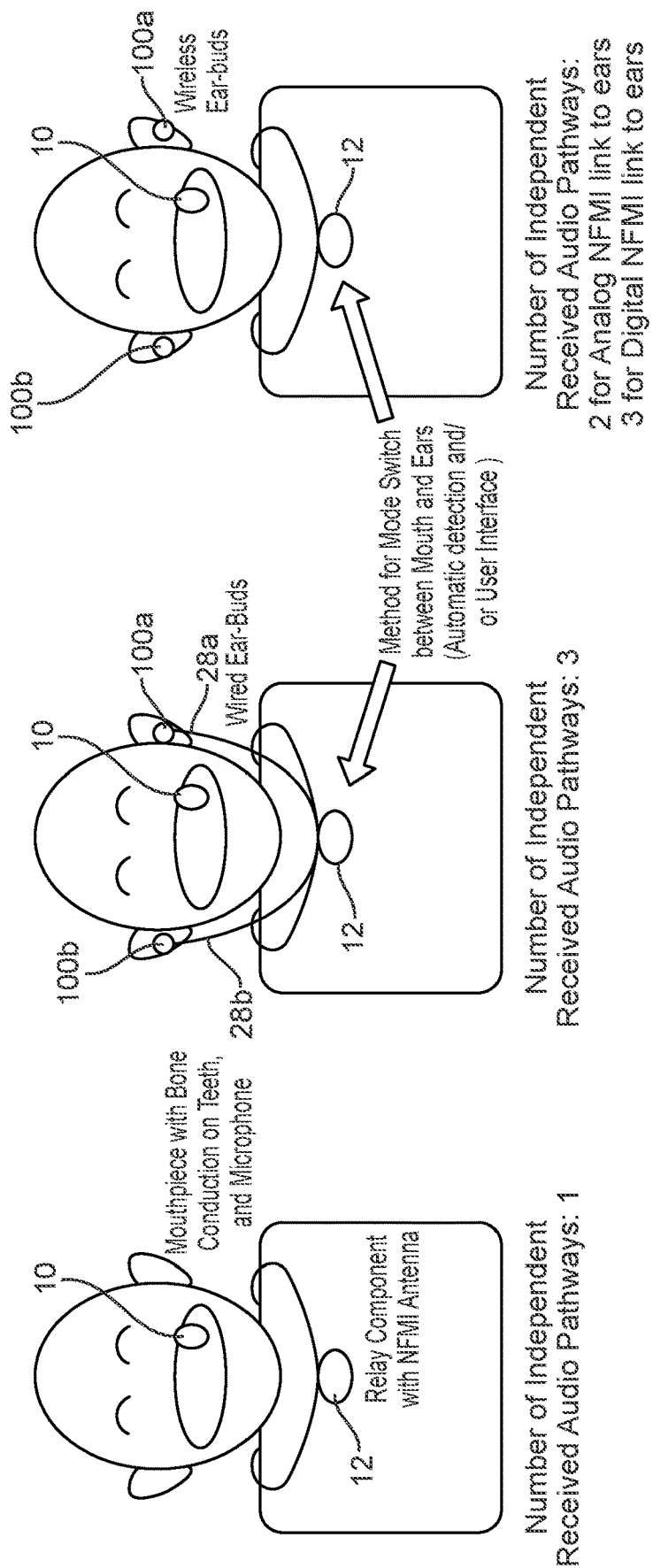
FIGS. 8A-8C show schematic illustrations of variations of the two-way communication system of FIG. 5 with and without the earpiece component and additionally represent various user options and earpiece component connection configurations.

FIGS. 8A-8C illustrate different physical configurations of the system with and without the earpiece components 100. The different physical configurations can advantageously enable various numbers of audio pathways into a person's perception.

FIG. 8A further illustrates a partial schematic variation of the two-way communication system without an earpiece component 100 (and no hearing protection). The system in FIG. 8A provides a person with one independent receivable audio pathway into their perception, for example, from the mouthpiece component 10.

FIG. 8B further illustrates a partial schematic variation of the two-way communication system with left and right earpiece components 100*a*, 100*b* in wired communication with the relay component 12. The system in FIG. 8B provides a person with three independent receivable audio pathways into their perception, for example: (1) from the mouthpiece component 10, (2) from the left earpiece component 100*a*, (3) from the right earpiece component 100*b*, or any combination thereof.

FIG. 8C further illustrates a partial schematic variation of the two-way communication system with left and right earpiece components 100*a*, 100*b* in wireless communication with the relay component 12. The system in FIG. 8C provides a person with five independent receivable audio pathways into their perception, for example: (1) from the mouthpiece component 10, (2) from the left earpiece component 100*a* having an analog NFMI link with the relay component 12, (3) from the left earpiece component 100*a* having a digital NFMI link with the relay component 12, (4) from the right earpiece component 100*b* having an analog NFMI link with the relay component 12, (5) from the right earpiece component 100*b* having a digital NFMI link with the relay component 12, or any combination thereof.

Although not illustrated, the two-way communication system can have, as described above, left and right earpiece components 100*a*, 100*b* in wired and wireless communication with the relay component 12. Such a dual wired/wireless system provides a person with seven independent receivable audio pathways into their perception, for example: (1) from the mouthpiece component 10, (2) from the left earpiece component 100*a* having a wired link with the relay component 12, (3) from the left earpiece component 100*a* having an analog NFMI link with the relay component 12, (4) from the left earpiece component 100*a* having a digital NFMI link with the relay component 12, (5) from the right earpiece component 100*b* having a wired link with the relay component 12, (6) from the right earpiece component 100*b* having an analog NFMI link with the relay component 12, (7) from the right earpiece component 100*b* having a digital NFMI link with the relay component 12, or any combination thereof.

A user can select which of the one or multiple independent receivable audio pathways to receive (and listen to). For example, a control/control interface (e.g., one or more controls/control interfaces 112) can enable a user to select between the mouthpiece component 10 and one or both of the earpiece components 100.

The system can automatically select which of the one or multiple independent receivable audio pathways a user receives (and can listen to), for example, based on one or more of the status signals described above.

The system can enable a user to receive an audio pathway alone or separate from another audio pathway. For example, when the system has multiple audio pathways, the system can activate one audio pathway at a time. The activated audio pathway can be routed to the appropriate sound or vibration emission source, for example, the one or more speakers 106 of a left earpiece component 100*a*, the one or more speakers 106 of a right earpiece component 100*b*, or the one or more transducers 18 of the mouthpiece component. The one or more transducers 18 can be configured to deliver vibration, receive vibration, or both.

The system can enable a user to receive multiple audio pathways simultaneously. For example, when the system has multiple audio pathways, the system can activate multiple audio pathways at a time (e.g., 2, 3, 4, 5, 6, 7, or more audio pathways). The activated audio pathways can be routed to the appropriate sound or vibration emission source, for example, the one or more speakers 106 of a left earpiece component 100*a*, the one or more speakers 106 of a right earpiece component 100*b*, the one or more transducers 18 of the mouthpiece component, or any combination thereof.

For example, with 3 independent audio pathways for wireless received audio illustrated in FIG. 8B (right ear, left ear, and teeth), the system has the ability to provide simultaneous multiple-radio communications and provide a clear mechanism of distinguishing the audio source when multiple radios are involved. If multiple audio sources are routed through just one of the available audio pathways (ears or teeth), preamble tones, background tones, or other audio shading may be implemented to signify audio source. In addition, a single ear-component (left/right) may be used to further distinguish ear-audio from teeth-audio (which effectively travels to both inner ears). If two ear-components are worn, they may be selectively chosen by the relay component 12 using the data interface to help distinguish audio source. Combinations of audio sources can also be used with phase time/coordination to provide 3D or directional audio to make different sources sound like they are coming from different directions.

Regardless of the incoming audio path chosen, the mouthpiece component 10 may be used as the microphone, which enjoys extremely good voice SNR due to physical placement, intentional attenuation, and body noise shielding.

Figure 9:
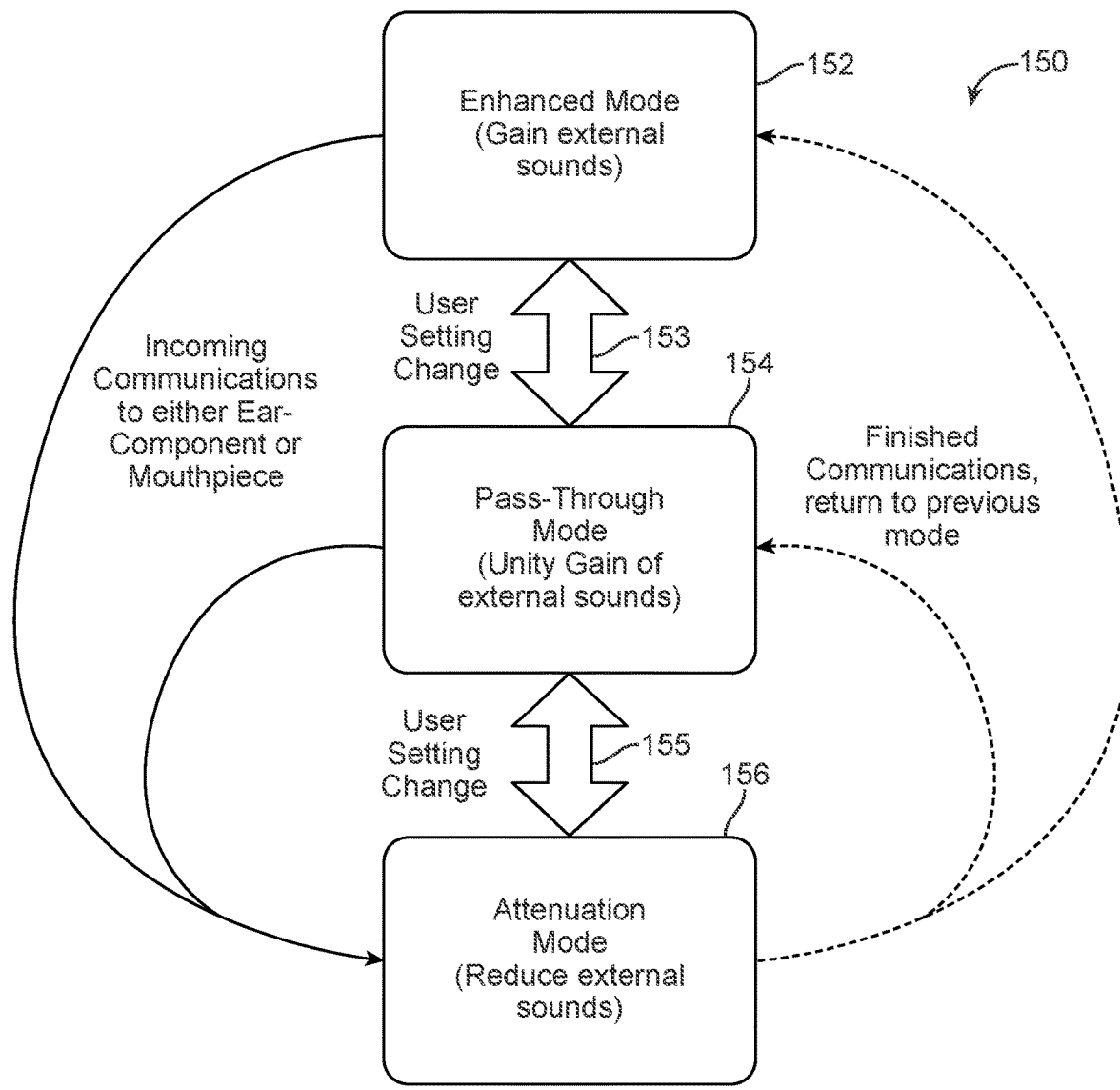
FIG. 9 shows a schematic illustration of a variation of various audio modes of an earpiece component.

FIG. 9 is a schematic illustration of a variation of various audio processing modes 150 of an earpiece component 100 for incoming communications. The various audio modes 150 can each process external sound 102 received by the earpiece component 100 differently from one another. For example, the system can have an enhanced mode 152 that can gain external sounds 102, a pass-through mode 154 that can perform or have a unity gain of external sounds 102, an attenuation mode 156 that can dampen external sounds 102, or any combination thereof. Transitions between and among the different modes 152, 154, and/or 156 can occur automatically when incoming communications arrive. The system can automatically apply the different modes 152, 154, and/or 156 as needed, dependent on the incoming communications received. For example, when the relay component 12 receives communications from the mouthpiece component 10 and/or when the earpiece component 100 receives communications from the relay component 12, the system can automatically apply mode 152, mode 154, or mode 156 as needed without any input from the user.

Additionally or alternatively, the various modes 150 (e.g., mode 152, mode 154, and/or mode 156) can be selectable by the user in real-time. For example, the different modes 150 can each be selectable using one or more audio controls. Each audio mode 150 can be associated with a separate audio control, for example, a first audio mode (e.g., enhanced mode 152) can be associated with a first audio control, a second audio mode (e.g., pass-through mode 154) can be associated with a second audio control, and a third audio mode (e.g., attenuation mode 156) can be associated with a third audio control. The first, second and/or third controls can be selectable (e.g., separately, sequentially and/or simultaneously selectable) by a user to turn on, turn off, and/or adjust (e.g., increase or decrease the effect of the audio mode) the audio modes 150 associated with each control. Each audio mode 150 can be associated with a separate setting of a single audio control, for example, a first audio mode (e.g., enhanced mode 152) can be associated with a first setting of an audio control, a second audio mode (e.g., pass-through mode 154) can be associated with a second setting of the audio control, and a third audio mode (e.g., attenuation mode 156) can be associated with a third setting of the audio control. The first, second and/or third settings can be selectable (e.g., separately, sequentially and/or simultaneously selectable) by a user to turn on, turn off, and/or adjust (e.g., increase or decrease the effect of the audio mode) the audio modes 150 associated with each control setting. Multiple audio modes 150 can be associated with one or more single audio controls. For example, a first, second, and/or third audio mode (e.g., modes 152, 154, and/or 156) can be associated with a first control and/or control setting. Additionally, or in combination, the first, second and/or third audio mode (e.g., modes 152, 154, 156) can be associated with a second control and/or control setting. For example, the first control and/or control setting can be associated with low frequency sound and the second control and/or control setting can be associated with high frequency sound. As an example, two or three of the different modes 150 can be controlled with a single controller. One or more of the audio controls and/or control settings can be dependent on one or more of the other audio controls and/or control settings. For example, in one variation, only one mode 150 can be activated at a time. This can be used, for example, where the different modes 150 each filter the same frequencies or frequency bands. In another variation, two or more modes can be simultaneously activated. For example, different modes can be simultaneously activated where the different modes filter different frequencies or different frequency bands.

The audio controls can be switches, buttons, knobs, touch screens, touch surfaces, any combination thereof, or any other selectable interface. For example, the different modes 150 can be controlled with the one or multiple controls/control interfaces 112 shown in FIG. 5. Each audio control (e.g., control 112) can have one or more control settings as described above, for example, fully off, fully on, or partially on/off, where "off" corresponds to an inactivated state and "on" corresponds to an activated state. The partially on setting can correspond to any percentage activation between 0% and 100%, for example, 25% activation, 50% activation, 75% activation, or any other percentage between 0% and 100%. The modes 150 can correspond to three settings of a control/control interface 112 (e.g., three settings/positions of a switch, button, knob, touch screen, touch surface, etc.). The modes 150 can correspond to settings (e.g., on/off settings) of three different controls/control interfaces 112.

FIG. 9 further illustrates that a user can change from the enhanced mode 152 to the pass-through mode 154 via a user input 153 (and vice versa), and that a user can change from the pass-through mode 154 to the attenuation mode 156 via a user input 155 (and vice versa). Alternatively or additionally, FIG. 9 further illustrates that the system can automatically change from the enhanced mode 152 to the pass-through mode 154 without the user input 153 (and vice versa), and that the system can automatically change from the pass-through mode 154 to the attenuation mode 156 without the user input 155 (and vice versa). When the enhanced or attenuation mode 152, 154 is selected (e.g., by the system or the user), the gain or attenuation of external sounds 102 can be adjusted as described above, for example, automatically or with the same or a different control/control interface 112 that was used to select between the different modes 150. FIG. 9 further provides that incoming communications can be routed to the earpiece components 100 and/or the mouthpiece component 10, and that the finished communications can return to the previous mode. For example, the incoming communications can be routed to the earpiece components 100 independently of the external sound attenuation mode selected (e.g., by the user) or activated (e.g., by the system), and can optionally help to automatically select the attenuation mode as shown by the arrows in FIG. 9. The communications come in (e.g., to the mouth and/or the ears), and the external sound attenuation can be increased during that time, and return to the previous settings afterwards.

Figure 10:
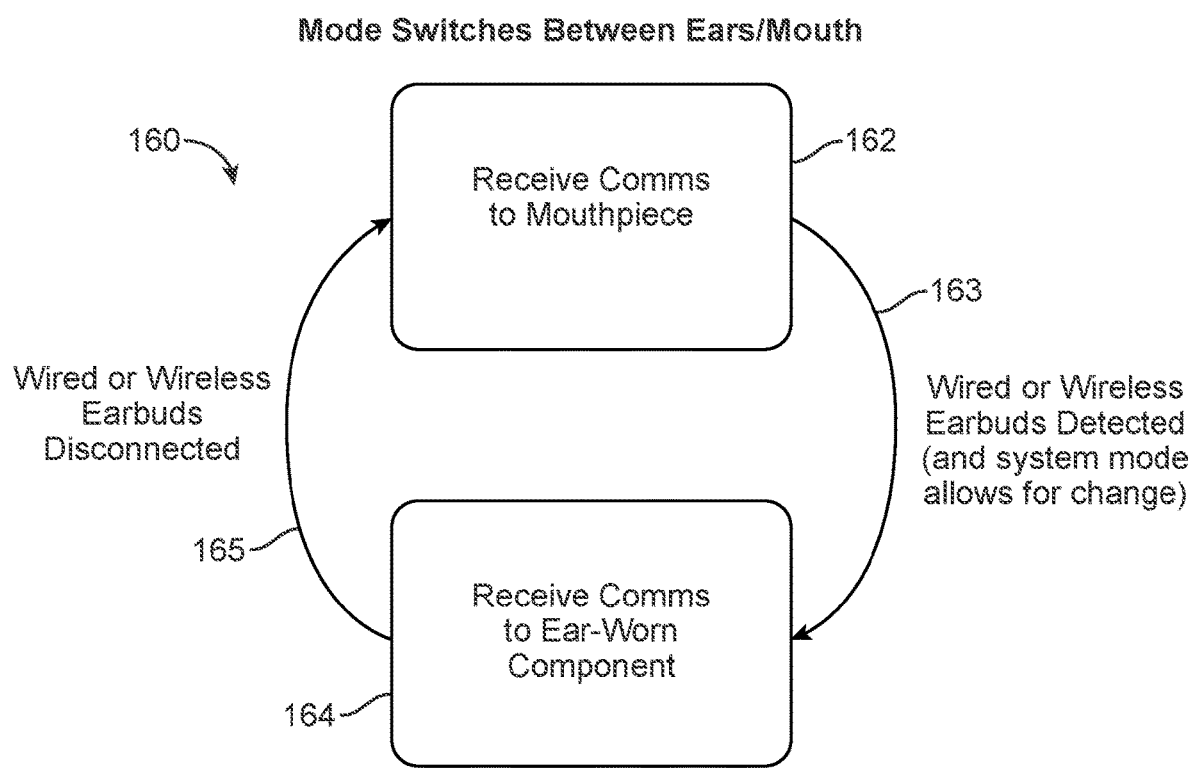
FIG. 10 shows a schematic illustration of a variation of various communication modes of the two-way communication system of FIG. 5 for incoming communication.

FIG. 10 is a schematic illustration of a variation of audio reception modes 160 of the system for incoming communications, for example, the system can have a mouthpiece component reception mode 162 and/or an earpiece component reception mode 164. FIG. 10 further illustrates that the incoming audio communications can be routed to the ears and/or mouth as desired with one or more of the audio reception modes 160 (e.g., modes 162 and 164). The system can have, for example, two incoming audio reception modes 162, 164 so that the earpiece components 100 (e.g., via mode 164) and/or the mouthpiece component 10 (e.g., via mode 162) can be manually or automatically selected to communicate sound (e.g., sound waves from an earpiece microphone 106) or sound signals (e.g., vibrations from a mouthpiece transducer 18) to a user. When the mouthpiece component reception mode 162 is activated, for example, by being manually or automatically selected, the user can receive communications from the mouthpiece component 10. When the earpiece component reception mode 164 is activated, for example, by being manually or automatically selected, the user can receive communications from the earpiece component 100. The modes 160 (e.g., mode 162 and/or mode 164) can be manually selected by the user or automatically selected by the system. For example, the system can automatically select the mouthpiece component reception mode 162 when the left and/or right wired/wireless earpiece components 100a, 100b are not connected to the system and/or are disconnected from the system, shown for example by arrow 165. As another example, the system can automatically select the earpiece component reception mode 164 when one or more earpiece components 100 are detected or otherwise connected to the system, shown for example by arrow 163. The system can be configured to switch from the mouthpiece component reception mode 162 to the earpiece component reception mode 164 if an earpiece component 100 is detected with or without additional input from the user and/or with or without another detected event (e.g., a malfunction of the mouthpiece component, at least two separate incoming sound sources are detected, etc.). The earpiece components 100 can be considered connected to the system when they are in wired or wireless communication with another component of the system, for example, the mouthpiece component 10, the relay component 12, and/or the infrastructure communication device 14. The earpiece components 100 can be considered connected when engaged with a user's ear. Engagement with a user's ear can be detected, for example, with a pressure sensor attached to or integrated with the earpiece components 100.

The system can have one or more mode controls that the user can manually select, for example, one or more switches, buttons, knobs, touch screens, touch surfaces, any combination thereof, or any other selectable interface. The user can use such mode controls to select between one or more sources of incoming communication, for example, between communication from the mouthpiece component 10 and/or communication from the earpiece components 100. Where the system has two or more earpiece components 100, each earpiece component 100 can have its own mode control. For example, the left earpiece component 100a can have a first mode control and the right earpiece component 100b can have a second mode control different from the first mode control. Additionally, or in combination, where the system has two or more earpiece components 100, one of the earpiece components 100, the relay component 12, and/or the infrastructure communication device 14 can have a mode control that the user can selectively activate to control audio reception in the two or more earpiece components 100. Alternatively or additionally, the system can have an application running on a personal computer (PC) that can configure the system for the different audio routing options. The PC can have a graphical user interface (GUI) and can send the selections to the system over either a wired or wireless communication link. For example, the GUI can display various audio routing options that the user can select by interacting with the GUI (e.g., touching the screen). The PC can send the selection(s) to the system. The PC can be any computer, for example, a smartwatch, a smartphone, a tablet, or any other personal computing device.

FIGS. 11A-11C illustrate that the earpiece components 100 can be removably positionable in and/or on a user's left and/or right ears 170a, 170b. FIG. 11A shows the left and right ears 170a, 170b without earpiece components 100. FIG. 11B-1 shows that a left earpiece component 100a can be removably positioned in and/or on the user's left ear 170a. FIG. 11B-2 shows that a right earpiece component 100b can be removably positioned in and/or on the user's right ear 170b. FIG. 11C illustrates that left and right earpiece components 100a, 100b can be removably positioned in and/or on the user's left and right ears, 170a, 170b, respectively. The earpiece components can be removably positioned as shown by the double-headed arrows 172a, 172b, 174, 176. The double-headed arrow 172a shows that the left earpiece component 100a can be repeatedly positioned in and removed from a left ear 170a. The double-headed arrow 172b shows that the right earpiece component 100b can be repeatedly positioned in and removed from a right ear 170b. The double-headed arrow 174 shows that the other earpiece 100 (e.g., either the left or right earpiece 100a, 100b) can be repeatedly positioned in and removed from the ear that does not have the earpiece 100 shown in FIGS. 11B-1 and 11B-2. The double-headed arrow 176 shows that the left and right earpieces 100a, 100b can be repeatedly positioned in and removed from the left and right ears 170a, 170b, respectively.

Once an earpiece 100 is positioned in and/or on an ear 170 as shown in FIGS. 11B-1, 11B-2 and 11C, the user can wear it for short or long periods of time before removing it, for example, about 1 second to about 60 seconds, about 1 minute to about 5 minutes, about 1 minute to about 60 minutes, about 1 minute to about 4 hours, about 1 minute to about 8 hours, 1 minute to about 12 hours, less than 24 hours, more than 24 hours, about 1 day or multiple days (e.g., 2, 3, or more days). The duration of wear can depend on environmental and operational-specific factors. For example, the earpieces 100 can be worn for about 1 hour, 2 hours, 3 hours, 4 hours, 5 hours, 6 hours, 7 hours, 8 hours, 9 hours, 10 hours, 11 hours, or 12 hours before being removed.

Each earpiece component 100 can have the same or different noise processing and/or modifying properties, the same or different components, and/or the same or different communication protocols described herein relative to one or more other earpiece components 100, for example, the same or different processing properties and/or components, the same or different damping properties and/or components, the same or different amplifying properties and/or components, the same or different noise cancellation properties and/or components, the same or different communication protocols and/or components, or any combination thereof. The noise processing and/or modifying properties, components and communication protocols described herein can be combined in any combination in any one or more earpiece components 100, as every permutation of disclosed features (e.g., system properties and components) and processes (e.g., communication protocols) is hereby explicitly disclosed.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art.

The specific embodiments described herein are offered by way of example only. Moreover, such devices and methods may be applied to other sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A communication system, comprising:
   an earpiece component removably engageable with or in proximity to an ear of a user, the earpiece component being capable of receiving environmental sound, wherein the earpiece component has zero or more selectable audio processing modes;
   a mouthpiece component removably engageable to one or more teeth of the user, the mouthpiece component having an integrated antenna;
   a microphone;
   a relay component in communication with the mouthpiece component and/or the earpiece component; and
   an infrastructure communication device, wherein the relay component is configured to interface between the mouthpiece component and/or the earpiece component and the infrastructure communication device.

2. The system of claim 1 wherein the one or more selectable audio processing modes comprise at least one of an enhanced mode configured to apply a gain to environmental sound, a pass-through mode configured to apply a unity gain to environmental sound, and an attenuation mode configured to reduce environmental sound.

3. The system of claim 2 wherein the earpiece component has a selectable control interface for selecting the one or more selectable audio processing modes.

4. The system of claim 3 wherein the selectable control interface comprises one or more switches, buttons, knobs, touch screens, and/or touch surfaces.

5. The system of claim 1 further comprising an actuator configured to provide bone conduction sound transmission into the one or more teeth of the user, wherein the earpiece component is configured to provide active and/or passive noise protection.

6. The system of claim 5 wherein the mouthpiece component has the actuator.

7. The system of claim 1 wherein the earpiece component is configured to actively and/or passively dampen sound.

8. The system of claim 1 wherein the earpiece component is configured to actively cancel sound.

9. The system of claim 1 wherein the earpiece component is configured to transmit or receive communications wired or wirelessly.

10. The system of claim 1 wherein the earpiece component comprises an earpiece antenna, the microphone and an earpiece speaker.

11. The system of claim 10 wherein the earpiece antenna is configured for near field magnetic induction.

12. The system of claim 11 wherein the earpiece component is in wireless communication with the mouthpiece component via near field magnetic induction and/or is in wireless communication with the relay component via near field magnetic induction.

13. The system of claim 1 wherein the earpiece component is in wired communication with the relay component.

14. The system of claim 1 further comprising a system control in communication with the earpiece component.

15. The system of claim 1 wherein the system is configured for half-duplex and/or full-duplex communication.

16. The system of claim 1 wherein the integrated antenna of the mouthpiece component is configured to be insensitive to positioning upon a left or right side of the dentition.

17. The system of claim 1 wherein the integrated antenna of the mouthpiece component is configured for near field magnetic induction.

18. The system of claim 1 wherein the integrated antenna of the mouthpiece component comprises one or more loop coils arranged within the housing.

19. The system of claim 1 wherein the integrated antenna of the mouthpiece component comprises a wire-wound ferrite core or wide loop antenna.

20. The system of claim 1 wherein the mouthpiece component further comprises the microphone.

21. The system of claim 20 wherein the microphone comprises a MEMS-type air microphone.

22. The system of claim 20 further comprising an attenuation element in vibrational communication with the microphone.

23. The system of claim 20 wherein the housing defines air cavity in communication with the microphone.

24. The system of claim 1 further comprising a PVDF film vibrational sensor integrated with the mouthpiece component.

25. The system of claim 1 further comprising a power supply integrated with the mouthpiece component.

26. The system of claim 1 wherein the infrastructure communication device is configured to wirelessly transmit or receive communications.

27. The system of claim 1 wherein the relay component is in wireless communication with the mouthpiece component via near field magnetic induction.

28. The system of claim 1 further comprising an antenna in proximity to the relay component and configured as a loop configuration.

29. The system of claim 1 wherein the relay component is integrated with the infrastructure component.

30. The system of claim 1 further comprising a system control in communication with the relay component.

31. A communication system, comprising:
    an earpiece component removably engageable with or in proximity to an ear of a user, the earpiece component being capable of receiving environmental sound, wherein the earpiece component has zero or more selectable audio communications reception modes;
    a mouthpiece component removably engageable to one or more teeth of the user, the mouthpiece component having an integrated antenna;
    a microphone;
    a relay component in communication with the mouthpiece component and/or the earpiece component; and
    an infrastructure communication device, wherein the relay component is configured to interface between the mouthpiece component and/or the earpiece component and the infrastructure communication device.

32. The system of claim 31 further comprising an actuator configured to vibrate against the one or more teeth to provide the user with incoming audio transmissions via bone conduction, wherein the one or more selectable audio reception modes comprise at least one of a mouthpiece component reception mode and an earpiece component reception mode.

33. The system of claim 32 wherein when the mouthpiece component reception mode is selected, the system is configured to deliver communications to the user via the mouthpiece component, and wherein when the earpiece component reception mode is selected, the system is configured to deliver communications to the user via the earpiece component.

34. The system of claim 32 wherein the one or more selectable audio reception modes are configured to be automatically selected by the system and/or be manually selected by the user.

35. The system of claim 34 wherein the system automatically selects the mouthpiece component reception mode when the earpiece component is not connected to the system and/or when the earpiece component becomes disconnected from the system.

36. The system of claim 34 wherein the system automatically selects the earpiece component reception mode when the earpiece component is connected to the system.

37. The system of claim 34 wherein the earpiece component has a selectable control interface for selecting the one or more selectable audio reception modes.

38. The system of claim 37 wherein the selectable control interface comprises one or more switches, buttons, knobs, touch screens, and/or touch surfaces.

39. The system of claim 32 wherein the mouthpiece component has the actuator.

40. The system of claim 31 wherein the earpiece component is configured to provide active and/or passive noise protection.

41. The system of claim 31 wherein the earpiece component is configured to actively and/or passively dampen external environmental sound.

42. The system of claim 31 wherein the earpiece component is configured to actively cancel sound.

43. The system of claim 31 wherein the earpiece component is configured to transmit or receive communications wired or wirelessly.

44. The system of claim 31 wherein the earpiece component comprises an earpiece antenna, the microphone and an earpiece speaker.

45. The system of claim 44 wherein the earpiece antenna is configured for near field magnetic induction.

46. The system of claim 45 wherein the earpiece component is in wireless communication with the mouthpiece component via near field magnetic induction and/or is in wireless communication with the relay component via near field magnetic induction.

47. The system of claim 31 wherein the earpiece component is in wired communication with the relay component.

48. The system of claim 31 further comprising a system control in communication with the earpiece component.

49. The system of claim 31 wherein the system is configured for half-duplex and/or full-duplex communication.

50. The system of claim 31 wherein the integrated antenna of the mouthpiece component is configured to be insensitive to positioning upon a left or right side of the dentition.

51. The system of claim 31 wherein the integrated antenna of the mouthpiece component is configured for near field magnetic induction.

52. The system of claim 31 wherein the integrated antenna of the mouthpiece component comprises one or more loop coils arranged within the housing.

53. The system of claim 31 wherein the integrated antenna of the mouthpiece component comprises a wire-wound ferrite core or wide loop antenna.

54. The system of claim 31 wherein the mouthpiece component further comprises the microphone.

55. The system of claim 54 wherein the microphone comprises a MEMS-type air microphone.

56. The system of claim 54 further comprising an attenuation element in vibrational communication with the microphone.

57. The system of claim 54 wherein the housing defines air cavity in communication with the microphone.

58. The system of claim 31 further comprising a PVDF film vibrational sensor integrated with the mouthpiece component.

59. The system of claim 31 further comprising a power supply integrated with the mouthpiece component.

60. The system of claim 31 wherein the infrastructure communication device is configured to wirelessly transmit or receive communications.

61. The system of claim 31 wherein the relay component is in wireless communication with the mouthpiece component via near field magnetic induction.

62. The system of claim 31 further comprising an antenna in proximity to the relay component and configured as a loop configuration.

63. The system of claim 31 wherein the relay component is integrated with the infrastructure component.

64. The system of claim 31 further comprising a system control in communication with the relay component.

65. A method of providing two-way communication, comprising:
    providing a two-way communication system comprising:
        an earpiece component removably engageable with or in proximity to an ear of a user, the earpiece component being capable of receiving environmental sound, wherein the earpiece component has zero or more selectable audio processing modes;
        a mouthpiece component removably engageable to one or more teeth of the user;
        a microphone;
        a relay component in communication with the mouthpiece component and/or the earpiece component; and
        an infrastructure communication device, wherein the relay component is configured to interface between the mouthpiece component and/or the earpiece component and the infrastructure communication device.

66. The system of claim 65 wherein the mouthpiece component has an actuator configured to provide bone conduction sound transmission into the one or more teeth of the user.

67. A method of providing two-way communication, comprising:
    providing a two-way communication system comprising:
        an earpiece component removably engageable with or in proximity to an ear of a user, the earpiece component being capable of receiving environmental sound, wherein the earpiece component has zero or more selectable audio communications reception modes;
        a mouthpiece component removably engageable to one or more teeth of the user;
        a microphone;
        a relay component in communication with the mouthpiece component and/or the earpiece component; and
        an infrastructure communication device, wherein the relay component is configured to interface between the mouthpiece component and/or the earpiece component and the infrastructure communication device.

68. The system of claim 67 wherein the mouthpiece component has an actuator configured to vibrate against the one or more teeth to provide the user with incoming audio transmissions via bone conduction.

69. A method of providing two-way communication, comprising:
- receiving an environmental sound via an earpiece component which is removably engageable with or in proximity to an ear of a user, wherein the earpiece component has zero or more selectable audio processing modes;
- relaying the environmental sound to a mouthpiece component via a relay component, wherein the mouthpiece component is removably engageable to one or more teeth of the user and further has an integrated antenna;
- vibrationally conducting the environmental sound through the one or more teeth of the user via the mouthpiece component; and
- attenuating the environmental sound received by the earpiece component via an infrastructure communication device if the environmental sound exceeds a threshold level, wherein the infrastructure communication device is in communication with the relay component and/or earpiece component.

70. A method of providing two-way communication, comprising:
- receiving an environmental sound via an earpiece component which is removably engageable with or in proximity to an ear of a user, wherein the earpiece component has zero or more selectable audio processing modes;
- relaying the environmental sound to a mouthpiece component via a relay component, wherein the mouthpiece component is removably engageable to one or more teeth of the user and further has an integrated antenna;
- switching reception of the environmental sound to the mouthpiece component via an infrastructure communication device if the environmental sound exceeds a threshold level, wherein the infrastructure communication device is in communication with the relay component and/or earpiece component; and
- vibrationally conducting the environmental sound through the one or more teeth of the user via the mouthpiece component.

* * * * *